United States Patent [19]

Rider

[11] 4,279,002
[45] Jul. 14, 1981

[54] ADAPTER FOR RASTER OUTPUT SCANNING PRINTER

[75] Inventor: Ronald E. Rider, Palos Verdes Estates, Calif.

[73] Assignee: Xerox Corporation, Stamford, Conn.

[21] Appl. No.: 899,137

[22] Filed: Apr. 24, 1978

[51] Int. Cl.³ .......................................... H04N 1/36
[52] U.S. Cl. .................................. 358/257; 358/267; 358/296; 358/300; 371/57; 179/2 DP; 178/23 A
[58] Field of Search ............... 358/302, 257, 258, 267, 358/296, 300; 178/23 A, 15; 371/70, 22, 57, 65; 179/1 C, 2 C, 2 DP

[56] References Cited

U.S. PATENT DOCUMENTS

| | | | |
|---|---|---|---|
| 3,465,352 | 9/1969 | Carlson | 346/76 L |
| 3,605,091 | 9/1971 | Tong | 178/23 A |
| 3,820,123 | 6/1974 | Ammann | 354/7 |
| 3,872,446 | 3/1975 | Chambers | 364/200 |
| 3,889,057 | 6/1975 | Perreault | 358/267 |
| 3,898,627 | 8/1975 | Hooker | 354/7 |
| 3,953,859 | 4/1976 | Locke | 358/302 |
| 3,999,010 | 12/1976 | Oosaka | 358/302 |
| 4,000,371 | 12/1976 | Ogawa | 358/257 |
| 4,032,978 | 6/1977 | Wong | 358/298 |
| 4,070,648 | 1/1978 | Mergenthaler | 371/70 |
| 4,079,458 | 3/1978 | Rider | 340/728 |

Primary Examiner—Alan Faber
Attorney, Agent, or Firm—Barry Paul Smith; W. Douglas Carothers, Jr.

[57] ABSTRACT

An adapter is provided as an interface between a raster output scanning printer and an electronic image processor which formats digital information for use by the printer in creating printed images. The adapter accepts digital pulses through a structured array of communication lines from the electronic image processor. Each line is dedicated to the provision of certain video or control information which may be utilized by any one of a number of different raster output scanning printers. The electronic image processor is indifferent to the identity of the type of printer to which information is provided as the adapter serves to manipulate the data provided by the electronic image processor in a manner suitable to control the particular printer employed. The adapter is sensitive to the scanning cycles of the printer and accommodates deviations in scan time to increase or decrease the rate of provision of video information in accordance with fluctuations in printer motor speed. A phase lock loop with the printer motor is provided for this purpose. The adapter also multiplexes status information of operating conditions generated internally and from the printer, and serially sends this status information to the electronic image processor.

5 Claims, 16 Drawing Figures

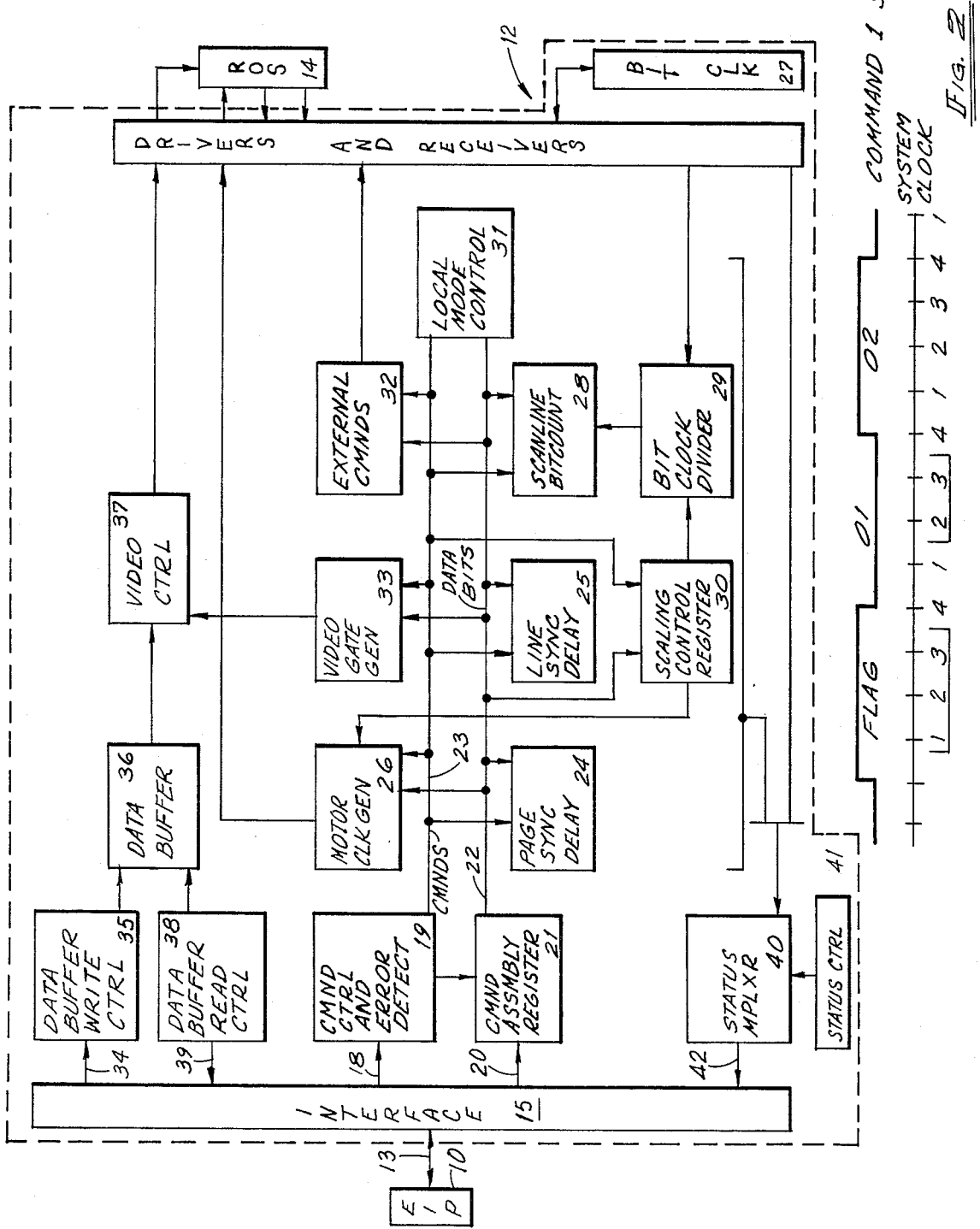

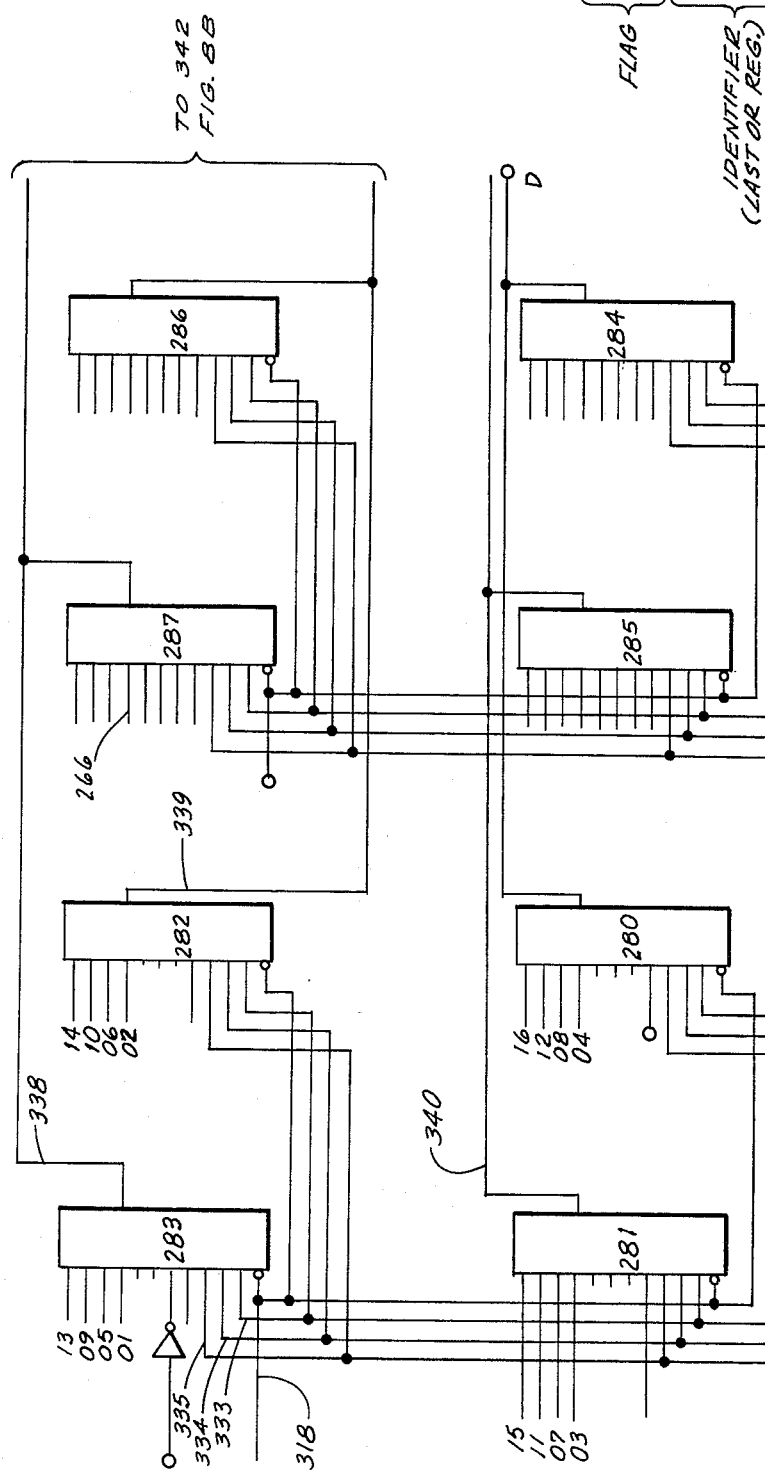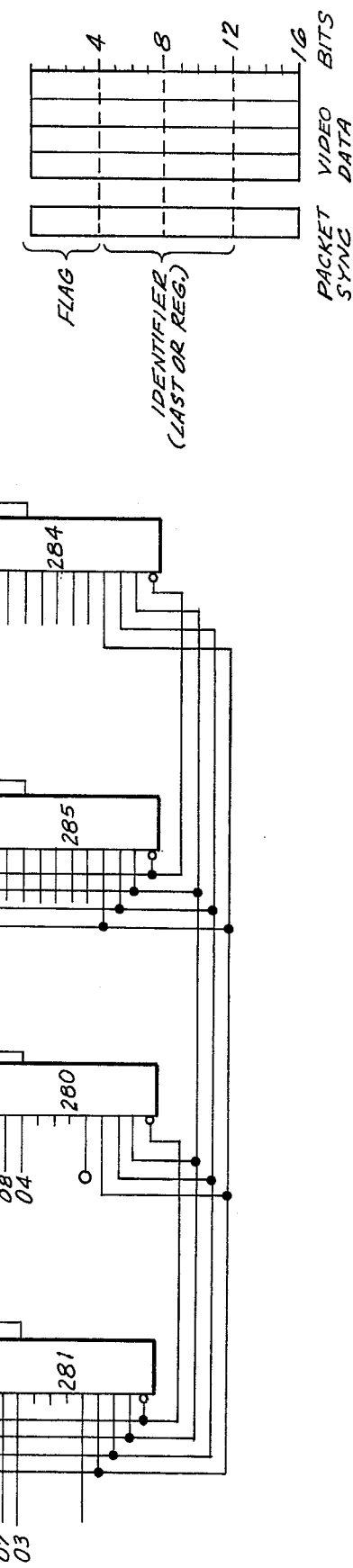

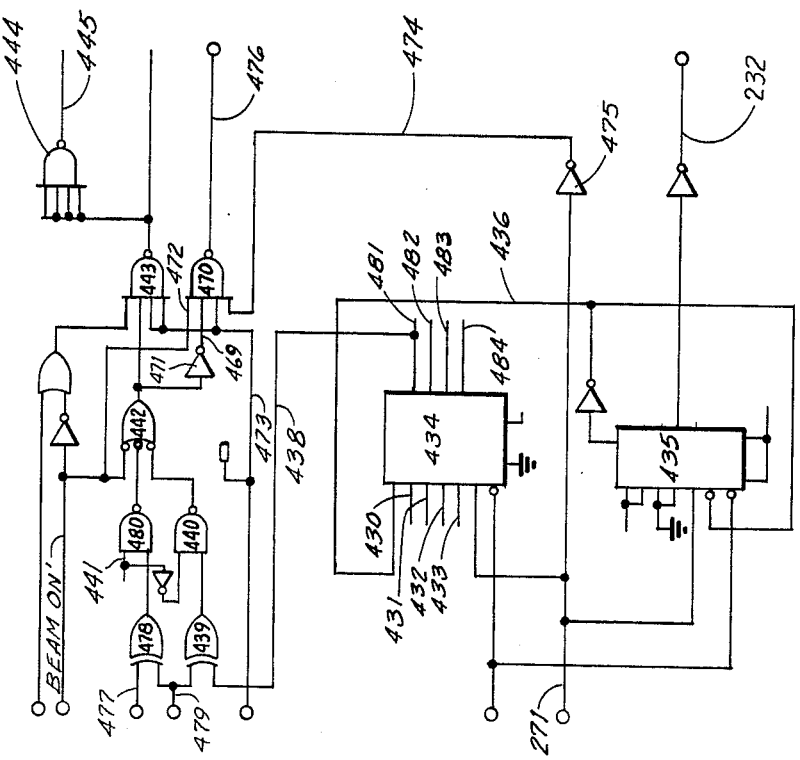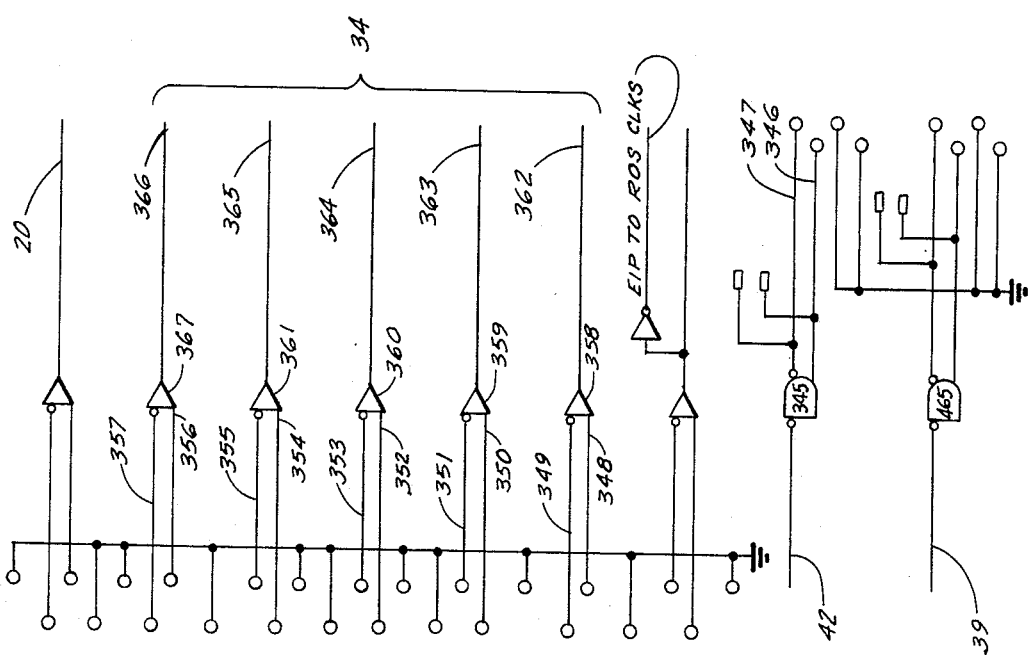

ADAPTER FOR RASTER OUTPUT SCANNING PRINTER

FIELD OF THE INVENTION

The present invention relates to the control of raster output scanning printers which print information that is provided in digital form by electronic image processors.

BACKGROUND OF THE INVENTION

Raster output scanning printers have been developed to respond to a multiplicity of digital signals providing print instructions. A raster output scanning printer traces a raster scan similar to a television raster. The mechanism for tracing the raster scan and for providing impulses which are sensed by some image forming medium are conventionally termed the printer engine. One example of a conventional raster output scanning printer engine is a laser scanning printer in a xerographic copy reproduction system. In such a xerographic printer, a laser beam is transmitted and optically modulated to provide a beam of light directed at a rotating polygon driven by a motor and having mirrored surfaces. Instant retracing occurs each time a different mirror surface arrives in position. The laser beam is reflected successively from each mirrored surface of the polygon at an angle that changes with rotation of the polygon. The beam thus is reflected in a scanning motion and is directed at a rotating xerographic copy drum. The beam is gated to strike the drum or blocked from striking the drum dependent upon digital print information which controls the vector of beam transmission. The result is that a latent image is produced on the drum wherein charged areas are either discharged or not, depending upon the binary information that either directs the beam at the drum or deflects the beam to prevent it from reaching the drum. Thereafter, toner is contacted with the area of the drum containing the latent image. Charges on the drum in the latent image area are transferred to sheets of paper, upon which the toner then becomes imprinted.

The successive binary bits of information controlling the vector of the laser beam are generated in some type of electronic image processor, usually a character generator. Heretofore, electronic image processors have been directly connected to raster output scanning printers in an integral inseparable fashion. As a result, the equipment configurations employed with raster output scanning printer systems are quite inflexible. Defects in system components or connections must be remedied at the installation site. Use of either the electronic image processor or the raster output scanning printer with any alternative device is virtually prohibited because of the intricate interconnection of these devices.

It is an object of the present invention to provide an adapter for a particular raster output scanning printer that responds to video and control information synchronously provided in binary form from any one of several types of electronic image processor. This is achieved by construction of the adapter with specific controls that respond to command and video information provided on an ordered array of dedicated input lines. In the preferred embodiment the adapter interfaces to a nine line plug connection with interface jacks positioned according to a standard raster output scanner interface convention. Each of the lines is dedicated to the provision of particular types of information. Preferably nine signal lines of connections are provided in a single plug in a specified order and at predetermined special intervals to interface with the adapter. Each signal line is a differentially driven, twisted pair of wires which may or may not be shielded. The adapter is thereby suitable for use to allow the raster output scanner associated therewith to be driven by any electronic image processor constructed with outputs according to this convention. This design allows the adapter to be used with raster output scanner units that require a bit rate of between one and one hundred megabits per second. The adapter is designed to allow some degree of physical separation of the adapter and raster output scanner associated therewith from the electronic image processor. A maximum allowable physical separation is about 40 meters for a 100 megabit per second system and 400 meters for a 10 megabit per second system.

A related object of the invention is to provide flexibility in the use of particular raster output scanning printers. A printer employing the adapter of the invention may be operated according to inputs from electronic image processors of varying degrees of sophistication. The printer may be subjected to particular specialized commands, if the nature of the utilization of the printer warrants. Alternatively, a more economical electronic image processor may be employed if specialized commands are not needed.

A further object of the invention is to provide an interface for a raster output scanner that performs veracity checks on data provided by the electronic image processor. Because of the typical situation in which there is a physical separation between the electronic image processor and the raster output scanner, noise externally induced in the signal transmission cable frequently becomes a problem. To prevent the printer from responding to such noise, veracity checks are performed on the binary bits transmitted by the electronic image processor. The state of these bits is sampled at intermediate times during a prescribed bit duration. Sampling may occur twice in order to detect noise of bits of command information, and may be performed three times within the bit interval to verify the start of a command from the electronic image processor.

Another object of the invention is to provide a means for informing an electronic image processor of the status of various operating conditions, both within the adapter of the invention and also in the raster output scanning printer. Status conditions within the printer and adapter, and also from externally connected equipment if desired, are signalled as being either normal or abnormal. These signals are stored in status buffers which are multiplexed through the adapter to a single status line connected to the electronic image processor. The adapter polls the various status buffer locations rapidly in predetermined order to provide status information to the electronic image processor. Without this feedback from the adapter, the adapter is insensitive to malfunctions of the printer or related equipment and operates to transmit information to the printer whether or not the printer receives and responds to that information.

A very significant feature of the adapter of the invention is the ability to respond to fluctuations of motor speed occurring in a motor driven printer engine. In a raster output scanning laser printer, the speed of the motor driving the mirror surfaced polygon, although closely controlled, does fluctuate slightly. In conventional systems this produces printed copies in which the spacing between characters and portions of characters is either to great or to small. That is, the printed material will be compressed too closely together if the motor speed slows slightly, or the characters and spacing therebetween will be stretched if the motor rotates slightly above the desired speed. The copy produced in conventional systems contains printed material with a very significant number of such irregularities. Most conventional systems attempt to adjust motor speed to the rate of provision of binary data. However, because of the much greater speed of data provision as compared with the speed of operation of the analog components that adjust motor speed, such regulation is inadequate.

It is an object of the present invention to adjust the speed of data provision to the raster output scanning printer to accomodate momentary fluctuations in printer engine speed. Since the digital components that regulate the provision of data arriving from the electronic image processor operate many orders of magnitude faster than the analog components governing motor speed, the adapter easily allows the rate of data provision to the printer to be adjusted to accomodate fluctuations in print motor speed.

DESCRIPTION OF THE DRAWINGS

FIG. 1 is a block diagram illustrating the system components of the adapter of the invention.

FIG. 2 is a timing diagram useful in illustrating the veracity checks performed on data by the adapter.

FIGS. 8A, 8B and 9 together illustrate in detail the status multiplexer circuitry and the status control logic of FIG. 1.

FIG. 11 illustrates in detail the interface connections between the electronic image processor and the adapter of FIG. 1.

FIG. 13 illustrates in detail the the video control logic of FIG. 1.

FIG. 15 illustrates the organization of video print data.

DESCRIPTION OF THE EMBODIMENT

Figure 3:
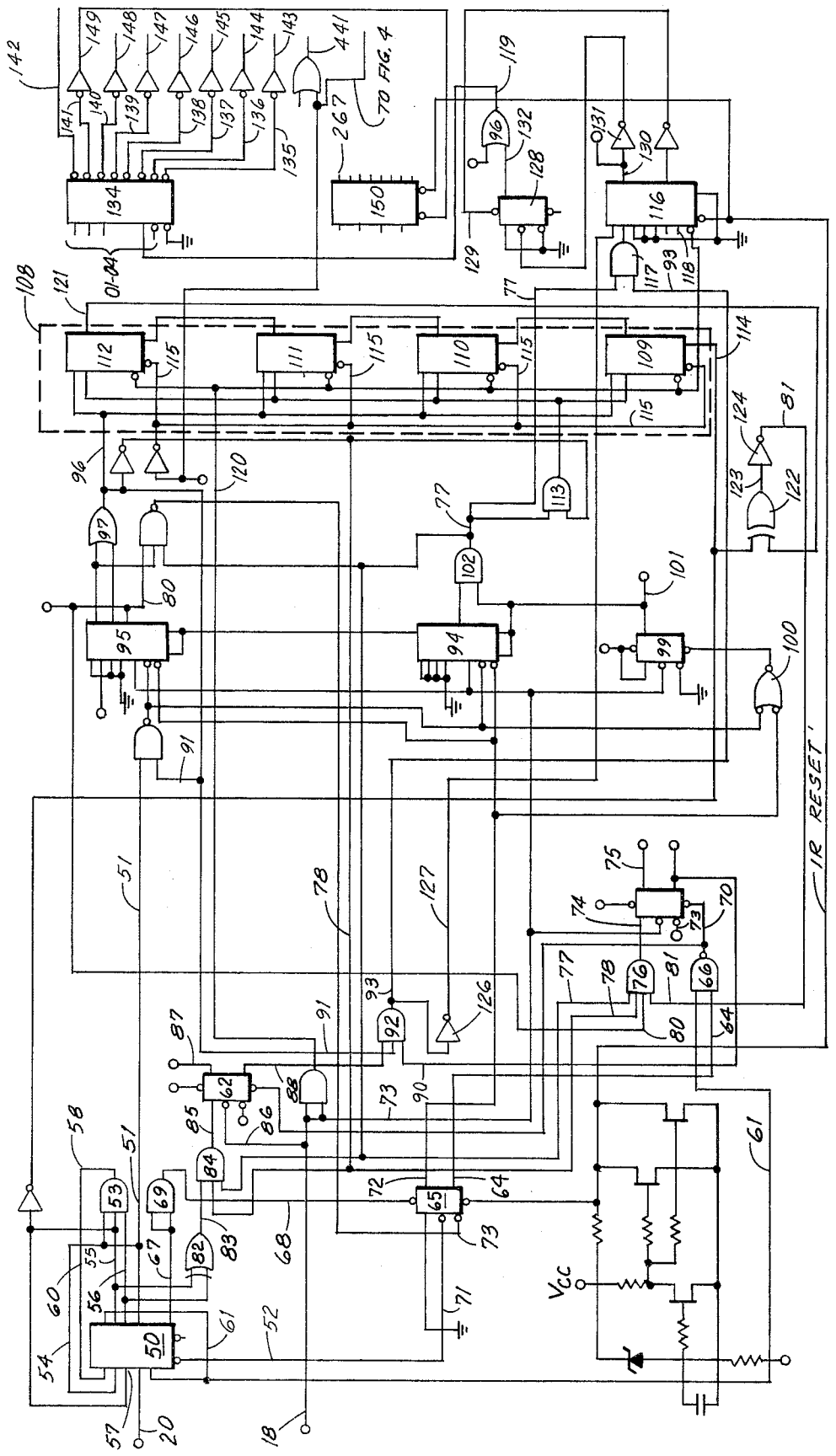
FIG. 3 illustrates in detail the command control and error detection circuit and the command assembly register of FIG. 1.

Referring now to FIG. 1 an electronic image processor is illustrated at 10 and is connected to the adapter illustrated in dashed lines at 12 to provide print information to a raster output scanner 14. Communication between the electronic image processor 10 and the adapter 12 is through a nine line interface indicated at 13 through which communication between the electronic image processor 10 and the adapter 12 is conducted. The nine line connection 13 and the interface 15, including associated drivers and receivers, are illustrated in detail in FIG. 11.

The essential communication with the electronic image processor 10 is conducted through a command module, and a video module. The command module includes a command control and error detection circuit 19, a command assembly register 21, motor clock generating logic 26, page sync delay circuitry 24 and line sync delay circuitry 25, a bit clock divider 29, a scaling control register 30, a video gate width generator 33, an external command interface 32, a local mode control 31, and a scan line bit counter 28. The video module includes data write and read controls 35 and 38 respectively, data buffers 36, a video control 37, a status control 41 and a bit clock 27. Status multiplexer 40 serves both the command and video modules. It should be appreciated that the designations command module and video module are for generalized reference only to indicate the types of functions performed in each section of the adapter. Overlapping functions within the several major system components exists to a considerable degree.

Communication between the electronic image processor 10 and the adapter 12 is initiated by the electronic image processor 10 and is directed toward the command module of the adapter 12. Line 18 carries system clock pulses generated within the electronic image processor 10. The system clock pulses are indicated in FIG. 1 as being directed to the command control and error detection circuit 19, but it should be understood that the clock pulses are utilized throughout the adapter 12.

A stream of command data is transmitted on line 20 to the command assembly register 21 in the command module. The organization of the command data is illustrated pictorially in FIG. 14. The command assembly register 21 and the command control and error detection circuit 19 perform certain identification and veracity checks on the data and distribute the command data on lines indicated collectively at 22 to various of the command module components. Likewise, command signals are carrier to command module components by connections indicated collectively at 23. The command signals and command data are passed to several functional subsystems. A page sync delay circuit 24 controls the raster output scanner 14 to prevent it from printing or from receiving print data during the period that the xerographic imaging drum rotates to carry a latent image of a sheet of paper and to position itself to receive an image to be latter imprinted upon a subsequent sheet of paper. Similarly, the line sync delay circuit 25 controls the system to accommodate the delay that occurs between the finish of one scan line and the start of the next.

A motor check generator circuit 26 sets the printer motor speed proportional to the commanded motor speed. However, a bit clock 27 is provided to generate clock pulses which are utilized within the system for certain video control functions. The bit clock 27 is asynchronous with respect to the clock pulses provided on the system clock line 18, and is adjusted by a bit clock register and by scan line bit counter circuitry 28 utilizing the bit clock divider circuit 29 and the scaling control register 30.

A local mode control circuit 31 is provided for use in maintenance testing and servicing the adapter. The local mode control circuit 31 is used to generate test patterns and test signals useful in locating and correcting any malfunctions.

An external command register 32 is provided by means of which communication with external devices is effectuated. Typically, such external devices would include manual controls on the xerographic printer itself, for example the PRINT button which is used to manually initiate a printing operation.

Video print data is transmitted to the adapter 12 from the processor 10 under the control of signals passed from the command module to the video module through a video gate width generator 33 to direct the laser beam of the raster output scanner 14 on target, or to deflect it from a target. The actual print data is transmitted from the electronic image processor to the video module of the adapter 12. The print data is passed on five lines indicated collectively at 34. Four of these lines conduct actual data bits in parallel. The fifth line is a packet sync signal which indicates the first and last parallel transmissions within a packet of data which is dealt with as a unit by the electronic image processor. The actual print data is transmitted four bits at a time from the electronic image processor 10 to the adapter 12, and is organized as depicted in FIG. 15. This parallel data transmission is in packets of one-half of a conventional byte of data, which is a parallel transmission eight bit wide. The data transmitted to the data buffer write control circuit 35 on four of the five connections indicated at 34 is therefore sometimes termed a "nibble" of data.

From the data buffer write control circuit 35, data is transferred to data buffers 36 from where it is taken by the video control circuit 37 for transmission to the raster output scanner 14. A data buffer read control circuit 38 is used to supply data to the data buffers 36 for transmission to the video control 37. The data buffer read control circuit 38 sends signals on a line 39 to the electronic image processor 10 to request additional packets of information to replace those packets read from the data buffers 36 and transmitted to the raster output scanner 14.

Status multiplexer circuits 40 are provided to monitor various functions internal to the adapter 12 as well as the status of external devices. The status control circuit 41 cycles through the data registers of the status multiplexer 40 to serially gate through the contents of the various status buffer register locations on a line 42 to the electronic image processor 10. In this way the electronic image processor 10 is kept abreast of the status of the various adapter and raster output scanner components to which it directs information.

FLAG BIT RECOGNITION

Figure 14:
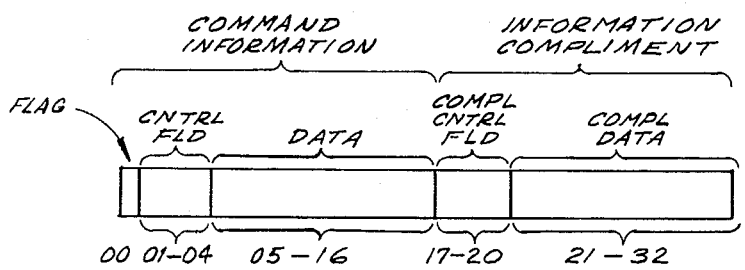
FIG. 14 illustrates the organization of command data.

Communication between the electronic image processor 10 and the adapter 12 is in words of command data, video or print data, and status data. Each command word from the electronic image processor 10 to the adapter 12 is 33 bits in length and is organized as depicted in FIG. 14 with bits numbered from 00 to 32. Each command includes one start or flag bit, 16 information bits, and 16 bits which are the complement of each of the information bits. This redundancy between bits is provided as a method to ensure that only valid commands are executed by the adapter. Of the 16 command information bits, the first four bits are control field bits to direct the following 12 command information data bits to the proper system components.

The electronic image processor 10 provides the raster output scanner 12 with a burst of commands which set the parameters of operation. The raster output scanner then proceeds to conduct the printing operation independently of the electronic image processor. Each command is a serial command bit stream as depicted in FIG. 14. The bits are clocked out of the electronic image processor 10 to the adapter 12 on the single twisted pair line 20 at one fourth the rate of a system clock which is transmitted on line 18. That is, each bit in a command has a cycle four clock bits in width as depicted in FIG. 2.

The command bits are received from the electronic image processor 10 in the command module of the adapter 12. The circuitry for initially processing the commands at the command assembly register 21 of FIG. 1 is depicted in detail in FIG. 3. The serial bit stream begins with a command or flag bit which is received on the input line 20 at an input to a Hex D data latch 50 configured as a five bit shift register. The command bits are sampled by the system clock which operates at a maximum rate of 25 megahertz and transmits clock pulses from the electronic image processor 10 on line 18. The system clock gates out the input contents of the data latch 50 to the output lines. Three consecutive true samples of a command bit are required for the system to recognize a valid flag bit, as indicated in FIG. 2. If all three samplings do not show a true condition to exist on command line 20, no command bit is recognized, but rather the signal received at line 20 is assumed to be noise. If a noise sample is detected, a dead time of 48 false command bits, that is 192 system clock sample cycles is required before a new flag bit will be recognized.

Sampling occurs at the data latch 50 in the following manner. Once the input line 20 has gone high, it is gated to the latch output 51 by the system clock acting at the clocking input 52 of the latch 50. The resulting output on line 51 acts as one input to an AND gate 53 which is held in a high condition. The same output on line 51 is also routed back to another one of the input pins to the data latch indicated at 54. With the next clock pulse at clock input 52, both the inputs at 20 and 54 are clocked through the data latch 50 and produce outputs, again at line 51 and this time also at line 55. Both the outputs at 55 and at 51 act as inputs to the AND gate 53, which is still not actuated because of the absense of an input on line 56. However, the output at line 55 is also routed back as an input to the data latch 50 at input pin 57. Accordingly, the next sequential system clock pulse at clocking input 52 to the data latch 50 gates through the inputs present at that time on lines 20, 54 and 57. The resulting outputs on lines 51,55 and 56 produce a valid output pulse at output line 58 from AND gate 53. The pulse at line 58 indicates that a valid start has been initiated.

VERACITY CHECK REGISTERS

The appearance of a valid start pulse on output 58 of AND gate 53 is returned as an input at lead 60 to the data latch 50. With the next system clock pulse at clocking input 52, the resulting command reset pulse from output 61 of the data latch 50 is used to clear the two error detection flip-flops, line noise flip-flop 62 and compare error flip-flop 63. These flip-flops, along with the rest of the command control and error detection circuitry are also depicted in detail in FIG. 3. The signal at 61 is transmitted to a NAND gate 66, which receives at its other input an output on line 64 from a J-K command timer flip-flop 65. The command reset pulse 61, acting at one input to NAND gate 66 and the $\overline{Q}$ output 64 of command timer flip-flop 65, which is high until that time, produces a low timer reset pulse at output 70 of NAND gate 66. This timer reset pulse resets the compare error flip-flop 63 and the line noise flip-flop 62, either or both of which may have been left in a set condition from a previous error or noise condition.

In addition to resetting the compare error flip-flop 63 and the line noise flip-flop 62, the command reset pulse 61 is returned as an input to the data latch 50. With the next system clock pulse at clocking input 52 to the data latch 50, a command begin signal is produced at output 67. The command begin signal at 67 acts through an inverter 69 and is transmitted to the set lead of the command timer flip-flop 65. The J lead of the command timer flip-flop 65 is always held high, so that with the next system clock pulse at input 71 to the flip-flop 65, a command timer-on pulse is produced at the Q output 72. This removes the error detection reset term by setting the $\overline{Q}$ output 64 of the command timer 65 to zero. The command timer-on signal at 72 is thereafter present with the appearance of system clock pulses until a command dead time done signal 73 is received, the generation of which will hereinafter be described.

Following the receipt of a valid command flag bit on input 20 to the data latch 50, the command data bits are thereafter received. Certain veracity checks are performed on these data bits. As previously indicated, each data bit is four sample times long. That is, each data bit is four system clock pulse bit widths in duration, as illustrated in the diagram of FIG. 2. Each of the 32 data bits are sampled during both the second and third sample times, as indicated by the bracket associated with bit 01 in FIG. 2. If the two sample values are the same, the bit is good. Otherwise, the command is marked as invalid. Even if bad bits occur, all 32 bits of the serial command packet are processed.

In addition to the varacity check for line noise a check for valid data is also performed. To ensure accuracy of command information, the command information is provided in redundant form. That is, the second 16 bits of the 32 bit command packet are the 2's complement of the first 16 bits. After the first field of 16 data bits has arrived, the second field of 16 data bits is serially complemented and compared to the first field to provide final verification of the command packet.

COMPARISON ERROR

The veracity check for proper bit redundancy is registered in the compare error flip-flop 63 in FIG. 3. Once reset by the timer reset pulse at 70 from the NAND gate 66, the compare error flip-flop 63 is strobed by the system clock at input 73. If the J input to flip-flop 63 at 74 is high during any one of these clock strobes, a compare error signal will be generated at the Q output 75 thereof. The J input at 74 will only be actuated upon the occurrence of four concurrent conditions which will actuate the AND gate 76 to produce a compare error signal on line 75. The first condition is the appearance of a command clock enable signal at 77 which is generated with every fourth system clock pulse. The second condition is the appearance of a signal at input 78 of AND gate 76 indicating that the command has not been entirely inputted to the adapter 12. The signal on input 80 indicates that a comparison is taking place while the signal at 81 is indicative of a mismatch between a data pulse and the inversion of its complement. The first three inputs to AND gate 76 are basically timing signals while the input at 81 indicative of a mismatch is the operative signal to register a bad comparison of redundant command bits. The generation of the mismatch signal will be described hereinafter.

LINE NOISE ERROR

Line noise is detected by effectuating a comparison to ensure that the sampled values of a bit are the same at both the second and third intervals of the four time intervals of each data pulse, as illustrated in FIG. 2. The pulse value at the third interval is derived from the output 56 of data latch 50 while the value at the second interval is derived at output 55. Both outputs are passed through an exclusive OR gate 82. If the outputs of the data latch 50 on lines 55 and 56 are not the same, a bit error signal will be passed from the exclusive OR gate 82 as an input 83 to the AND gate 84. This input, together with the command clock enable signal 77 which occurs every fourth system clock pulse and the pulse at 78 indicating that the command is not all in, produces an output from AND gate 84 at 85 to the J input of the line noise flip-flop 62. With the appearance of a clock pulse at line 86 to flip-flop 62, a line noise signal is registered at the Q output therefrom on line 87.

If neither the line noise flip-flop 62 nor the compare error flip-flop 63 are actuated by the serial string of command bits, the $\overline{Q}$ outputs of these flip-flops at 88 and 90 respectively are combined with a signal 91 occuring at the conclusion of the command in an AND gate 92 to provide a command execute output at 93.

The generation of the timing signals required to effectuate the comparison of the 16 data pulses and the complements thereof and to generate pulses indicative of whether or not the entire command has been received are also depicted in detail in FIG. 3. The system clock at 18 strobes two cascaded four bit counter modules 94 and 95 from which the signal at line 96 at the output of OR gate 97 is ultimately derived to indicate that the command has been entered. The counters 94 and 95 are enabled by a command flip-flop 99 which is also clocked by the system clock from line 18. The command timer-on signal 72 from the command timer flip-flop 65 is fed through a NOR gate 100 which has an inverted output to reset the command flip-flop 99. Unless in the reset condition, the Q output 101 of command flip-flop 99 is on to enable the counters 94 and 95, which begin counting upon receipt of the command timer on signal 72 by the NOR gate 100.

Counts are accumulated in the counters 94 and 95 which accumulate four counts for each of the 32 data bits. Upon receipt of the entire set of 128 counts, OR gate 97 is actuated to produce the signal at 96 indicating that the command has been entered into the register formed by the data latch 50. The inverted form of this signal at 78 indicating that the command is not yet in prior to the enablement of OR gate 97 is passed back to the AND gates 84 and 76 for the veracity checks previously described. Also, halfway through the count the comparison signal at output 80 of counter 95 is generated to produce a comparison signal that allows the comparison of the first 16 bits with the last 16 bits of the command packet. This comparison signal 80 is returned to the AND gate 76 which is an input to the compare error flip-flop 63. Upon receipt of the first clock pulse by the counter 94, a command clock enable signal 77 is provided at the output of AND gate 102 and is transmitted to the AND gates 84 and 76 associated with the line noise flip-flop 62 and compare error flip-flop 63 respectively.

The command assembly register 21 of FIG. 1 includes a 16 bit shift register 108 employing four cascaded modules 109 through 112 and depicted in detail in FIG. 3. The sixteen bit shift register 108 is used to assemble the serial command. A command consists of one enable bit, three bits of a command number, and 12 bits of command data. Once the command is received and ascertained to be error free, a command strobe pulse 119 at the output of OR gate 96 is generated.

The shift register 108 is enabled through AND gate 113 by the concurrence of the command clock enable signal 77 from AND gate 102 and the input 78 from the inverted output of OR gate 97 indicating that the command has not yet been entered into the register. Concurrence of these two signals enables the shift register 108 to accept serial command bits in inverted form on line 114 from the data latch 50 and to shift these data bits through the shift register 108 until the shift register has been fully loaded. As long as the reset leads 115 of the shift register 108 have not been actuated by operation of the raster output scanner 14 in the local or test mode, the command data bits inputted at lead 114 will be assembled in the shift register 108.

There are 16 outputs from the shift register 108. Upon receipt of the seventeenth data bit in the command packet, following the start or flag bit, the first loaded data bit appearing at output 121 of shift register 108 is passed back to an exclusive OR gate 122, the other input of which is the inverted command data bit 17, in FIG. 14, which should be the complement of bit 01. A comparison check for proper redundancy is performed and an output will result at lead 123 of exclusive OR gate 122 as long as the inputs thereto are complementary. An inverter 124 provides a mismatch signal at 81 which is always low unless the inputs to exclusive OR gate 122 are the same, in which case the mismatch signal at 81 goes high. This indicates that an inaccuracy in the comparison resulted and sets the compare error flip-flop 63 through the AND gate 76 to produce the comparison error signal 75. The command is thus aborted following its receipt by the command control and error detection circuit 19. In the absence of a mismatch, however, the command execute signal will be generated at 93 by AND gate 92. A branch of the command execute signal 93 is passed to an inverter 126.

A delay shift module 116 functioning as a shift register is provided to develop the command strobe pulse 119 and is enabled by the command execute pulse 93 acting through AND gate 117, in conjunction with the command clock enable signal 77. The output of AND gate 117 is passed as an enabling signal to advance a binary bit initially loaded at input lead 118 through the delay shift register module 116 upon the occurrence of the inverted form of each system clock pulse at lead 120. The output 127 of inverter 126 operates through the delay shift module 116 to first set the strobe flip-flop 128 by a pulse at the set lead 129 thereto. Shift module 116 then generates an external strobe pulse at output 130.

The set strobe flip-flop 128 is gated by the external strobe pulse at 130 through an inverter 131 to produce a command strobe pulse at the Q output 132 thereof. The output 132 acts through the OR gate 96 to provide the command or local pulse 119 to the input of a decoder 134. The decoder 134 generates one of eight different outputs on the leads 135 through 142, depending upon the inputs thereto. The decoder 134 receives the first four data bits 01-04 of command data as its other inputs, in addition to the command strobe 119. As previously indicated, these four control field bits depicted at 01-04 in FIG. 14 are indicative of the particular system component or components to be addressed. The outputs of decoder 134 are provided through inverters as particular commands on lines 143 through 149. The command at output 149 is used to set scales. The set scales pulse clocks a register 150 which is utilized to generate commands to perform certain tests on the raster output scanner 14. The command at output 148 sets the bit clock 27. The command at output 147 sets the motor speed, while the command at output 146 sets the line sync delay and the command at output 145 sets the page sync delay. The command at output 144 is an external command and the command at output 143 sets the video gate in the video gate width generator 33.

LOCAL MODE CONTROL

Figure 4:
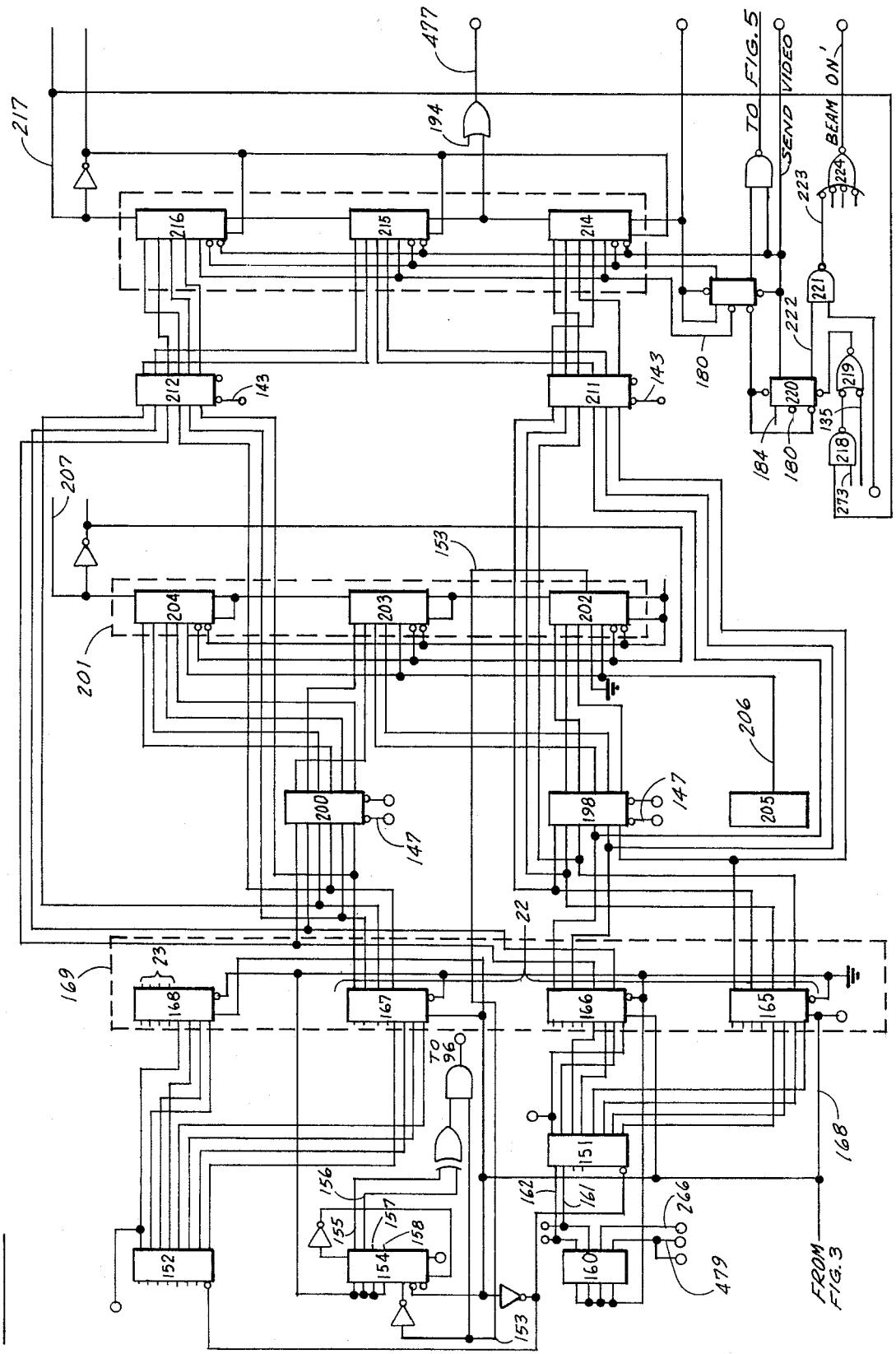
FIG. 4 illustrates in detail the local mode control circuit, the motor speed clock generator and the video gate width generator of FIG. 1.

FIG. 4 illustrates the circuitry for generating a programmed output of functions when the adapter 12 is to be operated in the local or test mode. Two programmed eight bit ROMS 151 and 152 are operated together to provide 16 bits of command information at a time when the raster outputs are to be operated in the local or test mode. In the local mode, a pulse train is provided as a clock line, but is derived from the video module. This video clock signal 153 acts through the counter 154 to increment the counter, and with each increment, bring out a new group of 16 outputs from the programmable ROMS 151 and 152. The four outputs 155-158 of the counter 154 serve as data inputs to the programmable ROMS 151 and 152. In addition, a manually operable dipswitch 160 is provided to produce two switching signals 161 and 162 which also serve as inputs to the ROMS 151 and 152. The programs in the ROMS 151 and 152 sequence the commands which are to go to the raster output scanner 14. These commands are carried as alternative inputs to a multiplexer 169 formed of four two-to-one multiplexing chips 165 through 167. The alternative inputs to the multiplexers 165-167 are derived directly from the 16 bit shift register 108 in FIG. 3. A switch in the electronic image processor 10 controls the presence or absence of a signal at 168 which varies the selection by the multiplexer 169 of either information data bits orginating in the electronic imaging processor 10 or test command bits. Selection of data information from shift register 108 of FIG. 3 occurs during actual transmission conditions. Alternatively, a local or test mode may govern operation to provide test command bits from the ROMS 151 and 152. In this instance, simulated data bits are derived from the programmed ROMS 151 and 152 which provide four combinations of eight commands each.

PAGE SYNC DELAY

Following selection by the multiplexer 169, the 16 data bit or data bit simulation signals are transmitted to a number of different locations as indicated in FIG. 1. The data bits 22 are location transmitted to the page synchronization delay circuit 24 depicted in FIG. 1 and in detail in FIG. 5. The purpose of the page synch delay circuit 24 is to direct the raster output scanner 14 to delay printing to accomodate the termination of printing on one sheet of paper and to allow a subsequent sheet to be fed into a print position. A typical application of the raster output scanning device 14 involves scanning sheets of paper lengthwise from the bottom to the top edges. Printing must not occur from the trailing side margin of one sheet of paper until after the leading side margin of the next sheet of paper has been established. A signal from the decoder 134 of FIG. 3 is used to establish the side margins and is connected to the page sync delay circuit 24 by lead 137 which transmits a clocking signal that actuates signal transmission through a pair of data latches 170 and 171 in FIG. 5. The existence of the set page sync delay signal on the lead 137 is dependent upon the one of eight outputs selected by the decoder 134 in FIG. 3. The last 12 of the first 16 data pulses of each command packet are connected to the latches 170 and 171 and the outputs of those latches are connected to a counter 172 formed of three counter chips 173–175 in such a manner as to provide a programmable delay in the form of a preset count in the counter chips 173, 174 and 175. That is, the signals 05 through 16 of FIG. 14 are treated as a code, which, through the latches 170 and 171 is registered as an initial count in the counter 172. These command bits occur no more often than once per page.

The twelve bit counter 172 is released whenever the page sync signal 179, the origin of which will be described hereinafter, appears at the flip-flop 178 as a clocking pulse. This produces a Q output at 189 from flip-flop 178 which releases the clear input to the counter chips 173, 174 and 175. Once released, the counter chips 173, 174 and 175 begin counting the output 180 of counter 181, which is organized as a ring counter to provide a signal at every fourth one of the line sync pulses 182, the origin of which will also be hereinafter described. Since the line sync counter 181 counts every fourth line sync pulse, and since each line sync pulse occurs at one fourth the rate of the system clock pulses on line 18, the page sync counter 172 produces an output at one sixteenth the rate of the system clock. When the page sync counter 172 has been counted to overflow, a time which is foreshortened to a programmed degree by the preset count initially entered in the counter chips 173, 174 and 174, a delayed page sync pulse 184 is produced. This occurs at a time calculated to correspond to the appearance of the leading margin of a fresh sheet of paper that extends perpendicular to the direction of laser beam scanning. That is, as the polygon mirror rotates to reflect the laser beam, the direction of the beam to produce a print image is inhibited until the delayed page sync signal appears at the overflow output 184 of counter chip 175 of the page sync counter 172. This creates a side margin along the edge of the page and printing of a line on the page does not start until this margin has passed.

LINE SYNC DELAY

Figure 5:
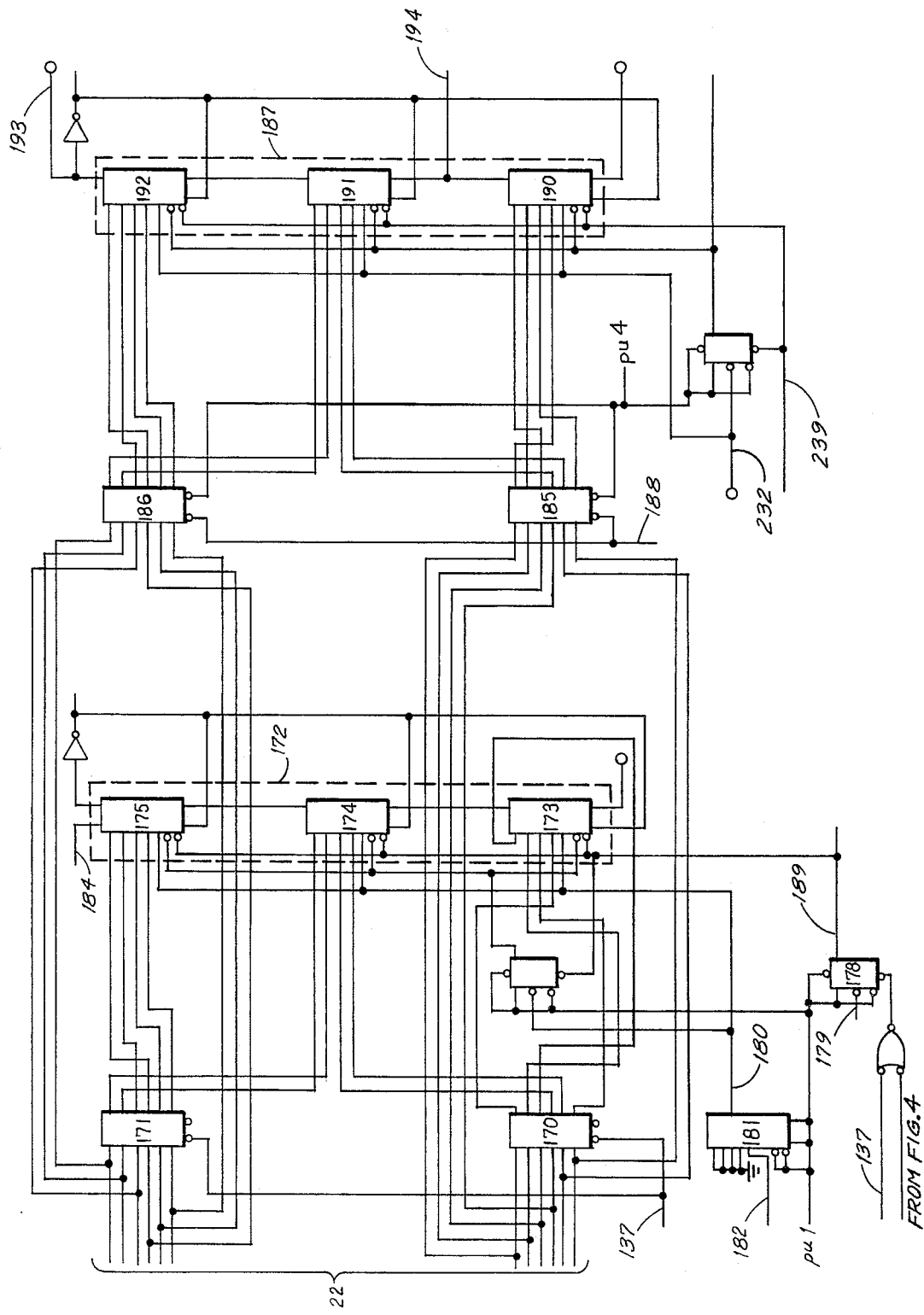
FIG. 5 illustrates in detail the page sync delay generator and the line sync delay generator of FIG. 1.

Similarly, the line sync delay circuitry also depicted in detail in FIG. 5 creates top and bottom margins in the direction of raster scanning. The line sync pulses, derived from the start of scan and end of scan sensors of the raster output seamer 14, create time durations during which video actuation during scanning at the ends of each line is inhibited. This creates margins at each end of each scan line. If scanning proceeds from the bottom of a sheet of paper to the top, bottom and top margins are generated. The means by which this is achieved is much the same as the system employed for generating the delayed page sync signal. That is, the data latches 185 and 186 are addressed by the fifth through the sixteenth command data bits designated 05 through 16 in FIG. 14. The connections from the data latches 185 and 186 to the counter 187 is in the form of a preprogrammed delay interval. Once addressed by the command data bits 05 through 16, the data latches 185 and 186 respond to the next set line sync delay pulse at 188 which clocks the information of command bits 05 through 16 at the inputs of data latches 185 and 186 to the outputs of thereof. This output information is transmitted and treated as a preset count to the line delay sync counter 187, having chips 190, 191 and 192. The counter chips 190, 191 and 192 are clocked by scaled bit clock pulses at one eight the rate of the generation of such pulses on line 232. The scaled bit clock is not the system clock, but rather is a clock pulse train derived from the bit clock 27 in FIG. 1. Overflow of the counter 187 at 193 is a delayed line sync pulse and is used for top and bottom margin generation as the end of each scan line.

One further feature of the line sync delay generation system is the creation of a X-line signal at 194 upon the overflow of the counter chip 190. The X-line signal is used to create a test pattern of insecting rectilinear horizontal and vertical lines in the form of a grid. Printed images of this grid are used when the system is operated in the local or test mode to detect errors and to evaluate system integrity.

MOTOR SPEED CONTROL

The motor speed clock generator 26 of FIG. 1 is depicted in detail in FIG. 4 and is organized in a fashion similar to the line sync delay circuitry 25 and the page sync delay generation circuitry 24. Specifically, the set motor speed signal on lead 147, from the decoder 134 of FIG. 3, when it appears, is applied as a clocking input to the data latches 198 and 200. The data pulses 05 through 16 appearing at the inputs of the latches 198 and 200 are, upon the occurrence of the set motor speed pulse on line 147, strobed at a preset count into the motor speed counter 201 which includes counter chips 202, 203 and 204. The motor speed counter 201 is stepped by the output 206 of a raw oscillator 205 which is a 12.5 megahertz crystal clock. The counter chips 202, 203 and 204, once loaded with the preset count from the data latches 198 and 200 are counted by the oscillator 205 to overflow. The overflow appears at line 207 as a speed clock enable signal. The delay from the receipt of the set motor speed signal at 147 by the counter 201 to the generation of the speed clock enable signal is proportional to the commanded motor speed.

One further feature of the motor speed clock generator is the output at 153 of counter chip 202. This output is the least significant bit of the entire motor speed counting system, and represents the rate of the crystal clock 205 divided by 2. This signal is used to address the counter 154 which is used when the raster output scanner 14 is operating in the local mode.

VIDEO GATE WIDTH GENERATOR

The video gate width generator 33 receives the command data bits from the command assembly register 21 as indicated in FIG. 1 and is depicted in detail in FIG. 4. The video gate width generator 33 employs data latches 211 and 212 and a counter 213 having counter chips 214, 215 and 216. The set video gate signal appears as a clocking input on leads 143 to the data latches 211 and 212 and is derived from the output of the decoder 134 in FIG. 3. The data bits in the data latches 211 and 212 are thus gated through to the counter 213 as a preset count. The counter chips 214, 215 and 216 are clocked by the line count signal at 180 which occurs every fourth line and is generated by the line sync clock generator 181 of FIG. 5. The video gate width carry out signal at 217 acts through the NAND gate 218 and through the inverted output of the NOR gate 219 to reset the flip-flop 220. This removes one of the inputs to the NAND gate 221, the other input of which is a print mode signal, and is always on during the print operation. Removal of the signal at input 222 to NAND gate 221 provides a between page beam on signal at 223 which shuts off video transmission by the laser beam through a NOR gate 224 having inverted inputs. It should be noted that thereafter the beam is turned back on to effectuate discharge of the statically charged portion of the drum which is not covered by paper.

MOTOR SPEED CONTROL

Figure 7:
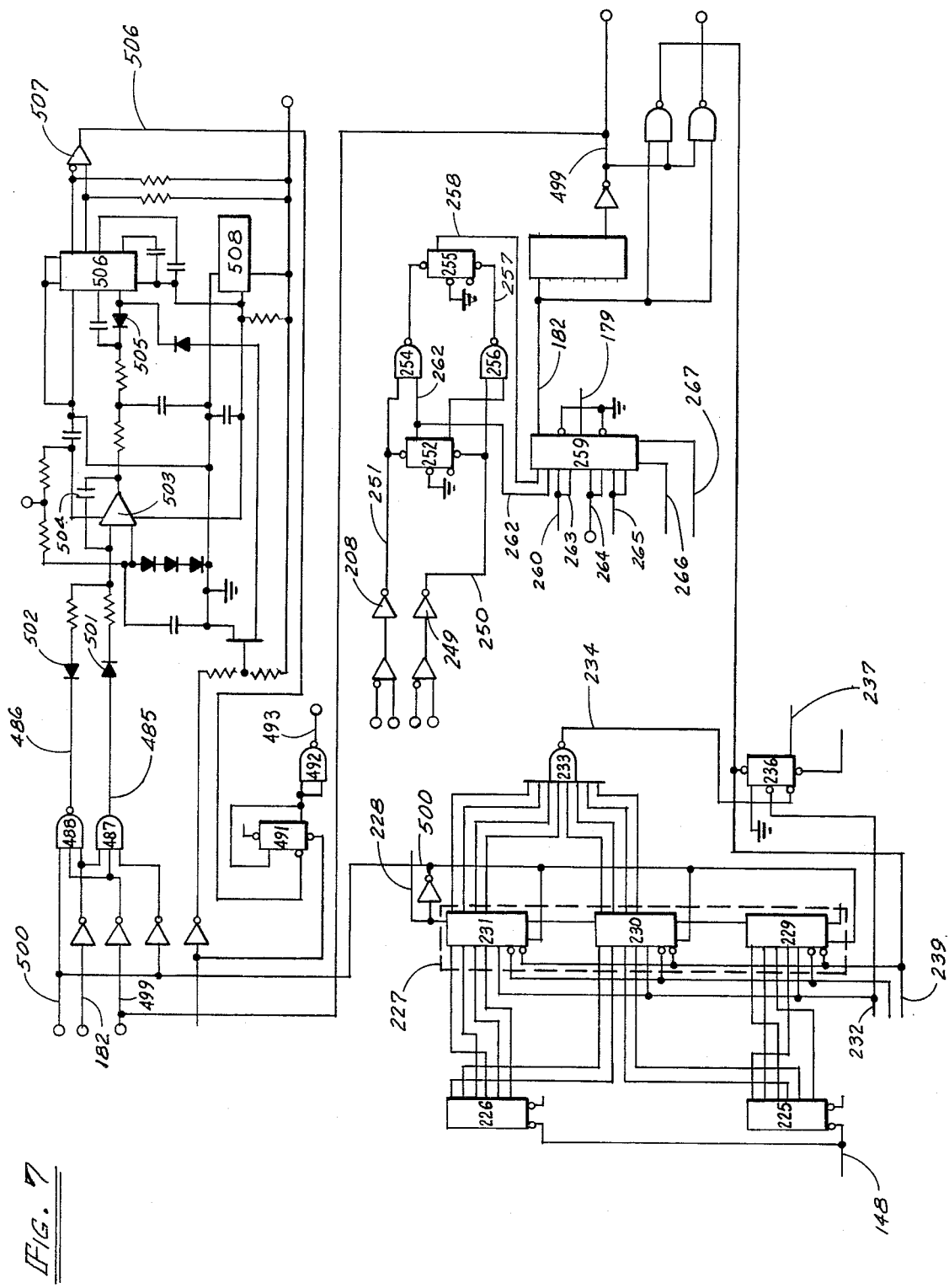
FIG. 7 illustrates in detail the scan line counter and bit count register and the bit clock circuit of FIG. 1 and start of scan—end of scan logic as derived from the raster output scanner of FIG. 1.

The circuitry of FIG. 7 is used to maintain the video clock for providing print data in synchronization with the actual speed of the polygon motor of the raster output scanner 14. The scan line bit counter at 28 in FIG. 1 is depicted in detail in FIG. 7. To control the video clock dependent upon operation of the polygon motor, the bit count register chips 225 and 226 of FIG. 7 are initially loaded with the count value that specifies the correct number of bits per scan line. This value is loaded into the scan line counter 227 comprised of three cascaded chips 229, 230 and 231. The set bit clock signal 148 from the decoder 134 in FIG. 3 is used to gate out the command data bits 05 through 16 of FIG. 14 through the register chips 225 and 226 to the scan line counter 227. This preset count shortens the time that it will take the scan line counter 227 to overflow when strobed. The overflow output of scan line counter 227 appears at line 228 as an end of line count signal.

The scan line counter 227 counts up from the preloaded value until it overflows on line 228, indicating the end of the scan line. The scan line counter 227 is a 12 bit counter similar to the page and line sync delay counters 172 and 187 of FIG. 5, and is initialized by the bit clock reset appearing on line 239. The scan line counter 227 is clocked on line 232 at the rate of the scaled bit clock divided by four. The counter 227 records the bit rate for a scan line, and when it reaches overflow, the end of line count is generated at 228.

64 bit times prior to the end of line count, the end of scan beam flip-flop 236 is set in order to force the laser beam on just before the end of scanning is to be detected. The input to flip-flop 236 is provided by a NAND gate 233 so that the laser beam is actuated just before the beam reaches the end of the line. The output 234 of NAND gate 233 acts at the K-input of the J-K flip-flop 236, the $\overline{Q}$ output of which at 237 turns the scan beam on.

The start of scan-end of scan detection logic is employed in association with the bit counter 227, and also is depicted in FIG. 7. The end of scan signal 250 and the start of scan signal 251 are derived from optical sensors in the raster output scanner 14 and which are located at either end of the scan line. The start of scan signal 251 and end of scan signal 250 are the outputs of inverters 208 and 249 at the optical sensor outputs and are transmitted as set and reset inputs respectively to the flip-flop 252. The Q output of flip-flop 252 and the start of scan signal 251 are combined in NAND gate 254 to produce a set output to flip-flop 255. Similarly, the end of scan signal 250 and the $\overline{Q}$ output of flip-flop 252 are provided as inputs to the NAND gate 256 to produce a resetting output 257 to the flip-flop 255. The resulting Q output of flip-flop 255 is a trail sync pulse which is transmitted as one input on line 258 to a dual four to one multiplexer 259. The flip-flop 252 also provides an input to the mutliplexer 259 at the Q output 262 which is indicative of a leading edge sync pulse. Subsequent pulse comparison will thereby occur on either the leading or trailing edges of clock pulses or at the appearance of a test line sync pulse 260 depending upon which of the leads 258, 262, 260 or 263 is selected by the multiplexer 259. The test line sync lines 260 and 263 are tied together to pins in the upper half of multiplexer 259 and are used only during the local mode. The output on line 182 from the top half of the dual four to one multiplexer 259 is passed as a line sync pulse to the register 181 in FIG. 5 and to the video module. The bottom half of the multiplexer 259 in FIG. 7 includes two sync inputs 264 tied together indicative of switch closure in the print engine. The other two inputs 265 are from the test page sync line, which is used only during the test mode.

Selection, of inputs in the top half of the multiplexer 259 is performed by means of a programmed output 266 from the dipswitch 160 of FIG. 4. The test mode output 267 of the register 150 of FIG. 3 serves as the selection input for the bottom half of the multiplexer 259. Thus, the scan line bit counter 227 and the polygon motor of the raster output scanner 14 can be synchronized from either the leading edge or trailing edge of the bit clock pulses. The multiplexer 259, if not operating in the test mode and if the leading edge is selected, will select the leading edge of bit clock pulses. If the leading edge is not selected it will select the trailing edge. If the raster output scanner 14 is operating in the test mode, the test line synchronization signal 260 serves as the line sync output.

SCALING CONTROL REGISTER

Figure 6:
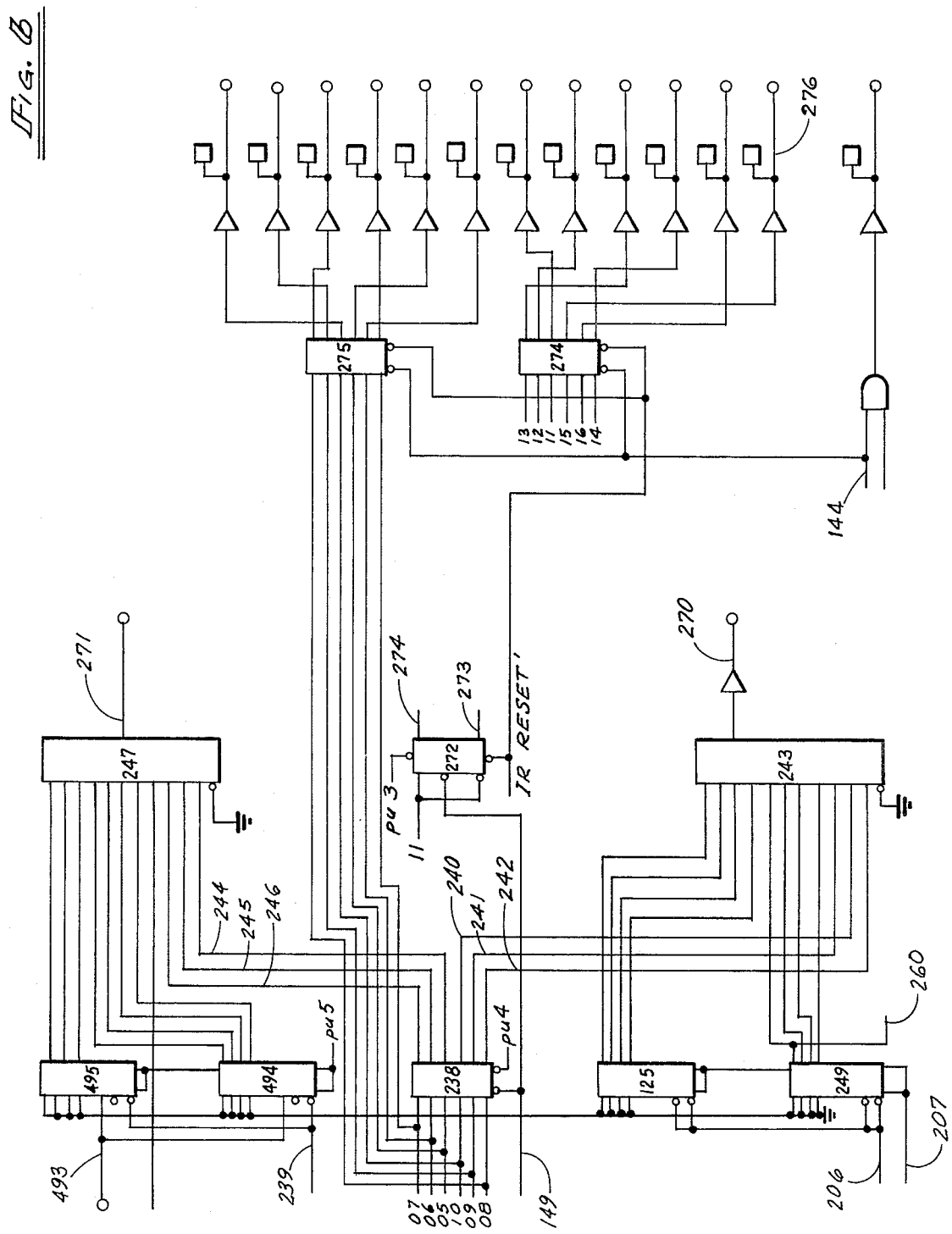
FIG. 6 illustrates in detail the scaling control register, the bit clock divider and the external command register of FIG. 1.

The scaling control 30 of FIG. 1 for the polygon motor clock is depicted in detail in FIG. 6. The command data bits 05 through 10 of FIG. 14 are provided as a code to the register chip 238, which is clocked by the set scales signal on line 149 from the decoder 134 of FIG. 3. The output signals at 240, 241 and 242 of the register chip 238 are transmitted as selection signals to the 8 to 1 multiplexing unit 243, while the bit scale signals on lines 244, 245 and 246 of the output of register 238 are transmitted as selection signals to the 8 to 1 multiplexer 247. The other inputs to the multiplexers 243 and 247 are hard wired into the system. The selection signals determine the divisors to be applied to the preset signals to the multiplexers 243 and 247. The output 270 of the multiplexer 243 goes to the motor drive module of the raster output scanner 14, where the polygon motor clock pulses are converted to 3-phase synchronous drive signals for driving the polygon motor. The multiplexer 243 receives a signal from the oscillator 205 of FIG. 4 on output line 206 through counter modules 249 and 125. The output 271 of the multiplexer 247 is the scaled bit clock signal derived from the bit clock 27 through a flip-flop 491 and inverter 492 in FIG. 7 as a bit clock pulse 493. Bit clock pulse 493 is scaled through counter modules 494 and 495.

The data bit 11 of FIG. 14 is applied at the inputs to the flip-flop 272 of FIG. 6 which is clocked by the set scales signal on line 149 from the decoder 134 of FIG. 3. The outputs of flip-flop 272 are used to carry the video beyond the end of the page. The Q output at 273 is employed in conjunction with the NAND gate 218 in FIG. 4 for this purpose. The $\overline{Q}$ output 273 of the flip-flop 272 is the inverted extend video signal and is used to overide the video gate width control circuit 33 in instances where this might be desirable. For example it would be desireable to overide the video gate width control in order to print on roll paper, rather than on discrete sheets of paper.

External command control circuitry is depicted in detail in FIG. 6. An external command buffer comprised of latches 274 and 275 receives the command data bits 05 through 16 and responds to a clocking pulse provided by the external command line 144 from the decoder 134 of FIG. 3. The coded outputs of the buffer registers 274 and 275 are provided as external command signals. For example, the signal at 276 is used to control the PRINT function key on a conventional xerographic reproduction device.

In the video control circuit 37, illustrated in detail in FIG. 13, NAND gate 470 responds to a video signal 469 derived from an inverter 471 at the output of OR gate 442. NAND gate 470 also responds to a signal at 472 indicating that the laser beam is not on, and to the beam enable signal 473 and to the absence of a scaled bit clock pulse indicated on line 474 from an inverter 475 to provide a signal at 476 to a toner clock. The toner clock keeps track of how many black bits are being put out. The toner clock emits one pulse for every black bit and thereby tracks the amount of toner used.

In the local or test condition, of course, real video data from output 438 of shifter register 434 is not supplied. Rather, test video signals are generated in place thereof. These signals are not passed to the video output, since the NAND gate 440 will prevent passage. Rather, the quad video signal on line 477 is passed to one input of an exclusive OR gate 478. The other input to exclusive OR gate 478 is a video polarity signal 479 from dipswitch 160 depicted in FIG. 4. The output of exclusive OR gate 478 is passed as one input to AND gate 480. Test video signals 481-484 are thus utilized instead of the video signal 445 when the raster output scanner 14 is to be operated in the local or test mode.

MOTOR SPEED TRACKING

A very important feature of the present invention is the arrangement which keeps the video clock tracking the polygon motor. In conventional systems, if a video clock is too fast in comparison with the scanning motor, data is packed to close together leaving oversized margins and squeezing the data. Conversely, if the video clock is to slow in comparison with the scanning motor, the data is stretched out too widely. According to the present invention, however, the video clock follows the operation of the polygon motor, so that this difficulty is avoided. The start of scan and end of scan signals 251 and 250 respectively are derived in FIG. 7 and are used to adjust the rate of output of the bit clock 27 in FIG. 1, illustrated in detail in FIG. 7. This in turn controls the rate of flow of data through the read and write buffers 38 and 35. The bit clock 27 generates bit signals to operate upon the video control 37 to cause the print rate to track with the polygon motor speed.

Control is achieved at the end of each scan line by the generation of start of scan and end of scan signals as inputs respectively to inverters 208 and 249 in FIG. 7. These signals are used to derive a line sync pulse delayed by 100 nanoseconds and indicated at 499. This signal in turn generates a pump down or pump up signal as indicated at the output leads 485 and 486 from gates 487 and 488 respectively. Once the end of line count signal appears on line 498 from scan line counter 227 and a line synchronization pulse is received on line 182, either a pump up signal 486 or pump down signal 485 is generated, as indicated in FIG. 7. The 100 nanosecond delayed line sync signal on line 499 stablizes the timing of the output of either NAND gate 488 or the AND gate 487 so that no output is derived until after the time associated with the delayed line synchronization signal on line 499 has expired. Once this occurs, and once the line sync pulse has been received on line 182, indicating that the raster has reached the end of the line, the gates 488 and 487 look to see whether or not the prescribed bit count has been reached for the line. This is indicated by the end of line count signal on line 500 which appears in its true form at the AND gate 487 and in its inverted form at the NAND gate 488. If the line sync pulse at 182 occurs before the end of line count signal on line 500 has appeared, this means that the bit clock 27 has not kept pace with the polygon motor. Accordingly, the bit clock 27 should be "pumped up" by a signal on line 486. Conversely, if the end of line count signal on line 500 is received before the line sync pulse, at 182, this indicates that the bit counter is running too fast, and should be slowed down to match the speed of the polygon motor.

Adjustment is achieved through the diodes 501 and 502 which add or detract from one input to a differential operational amplifier 503. The other input of the operational amplifier 503 is held at a constant voltage level, of approximately two volts. A capacitor 504 is connected across the variable input of the operational amplifier 503 to produce an integrated output. The voltage level at the output of the operational amplifier 503 determines the bias on the diode 505, which is a tuning diode for the voltage controlled oscillator 506. Increases or decreases in the base bias of the diode 505 will vary the oscillator frequency to adjust the output 506 of the raw bit clock from the amplifier 507. A precise voltage control to the other input to the operational amplifier 503 is maintained by the voltage regulator 508. Thus, variations in the speed of the polygon motor which occur due to hystersis, or other effects, do not adversely affect the print quality, since the bit clock 27 of FIG. 1, which determines the spacing of printed material on the page, is adjusted to meet the speed of the polygon motor.

STATUS MONITORING

Status of system operation and conditions is continually transmitted to the electronic image processor 10 in 257 bit packets at the rate of the system clock transmitted to the adapter on line 18. The first bit in the status bit packet is a flat bit that is always true followed by 256 bits of status data. Following the status bits packet there is a dead time in which the status line is false for a duration of at least 272 bit times before a subsequent status bit packet is initiated.

Figure 8B:
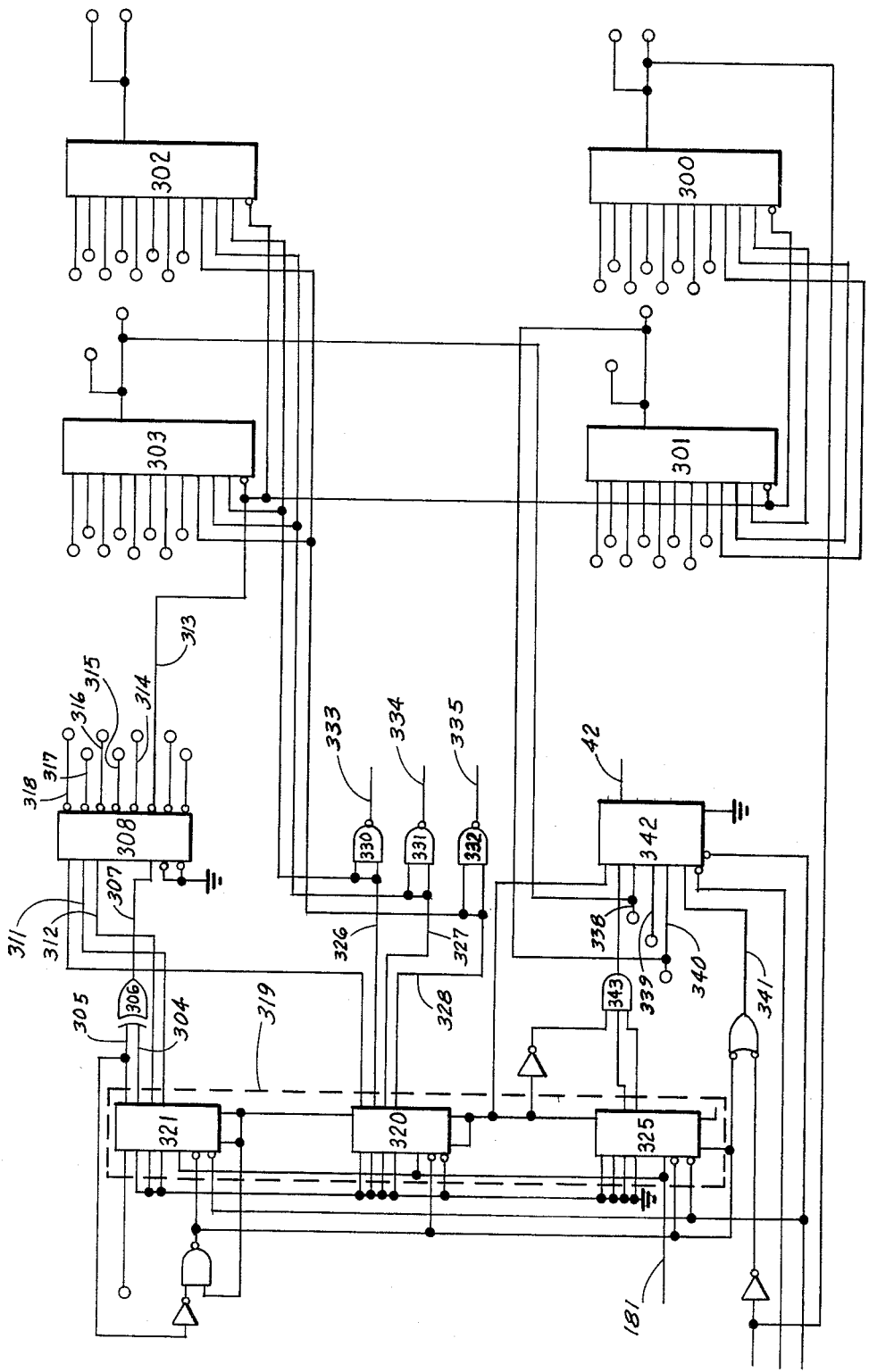
Figure 9:
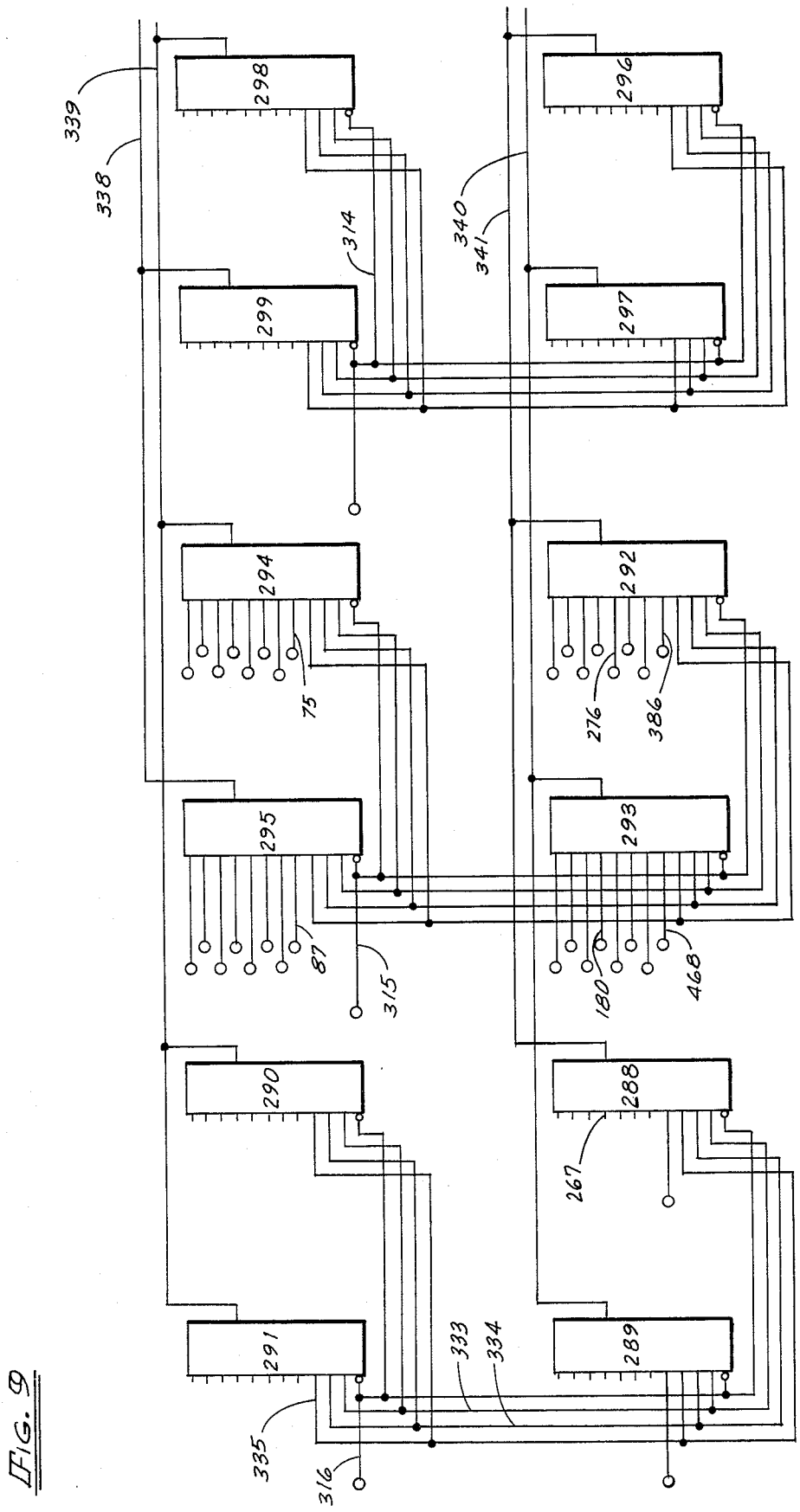

FIGS. 8A, and 8B and 9 show the inputs to the status multiplexer which sequences 8 rows of 32 bits down to a single serial bit transmission stream. In FIG. 8A for example, 8 to 1 multiplexers 280, 281, 282 and 283 are provided to select 1 of 64 bits. Each of these multiplexers provides one output at a time, one of which can be selected for transmission to the electronic image processor 10 at any given time. Each of the status bits transmitted to the electronic image processor 10 is sampled during both the second and third sample times as explained in connection with the command bits and as depicted in FIG. 2. If the two sample values for a bit are the same, the bit is good and is used to update the status buffer. If a bad status bit is detected the buffer is not updated and an error flag is set. Even if bad bits occur, all 256 data bits of the packet are processed.

The mutliplexers 280, 281, 282 and 283 provide the status pulses concerning the values of the message bits, certain video beam enable signals, and indications of whether or not the raster output scanner 14 is operating in the local mode. The multiplexers 284, 285, 286 and 287 operate in the same manner as do multiplexers 288-303 of FIGS. 8B and 9, which are likewise connected to the video module. The multiplexers 284 through 287 sample the motor speed bits and the motor scale bits for status. Similarly, the 8 to 1 multiplexers 288 through 291 of FIG. 9 sample the line sync and page sync bits. The multiplexers 292 through 295 sample the video gate width bits and certain external command bits. The multiplexers 296 through 299 sample special status bits. These bits provide the electronic image processor 10 with such information as to whether or not the machine is over temperature, and so forth. The multiplexers 300-303 of FIG. 8B sample information associated with the printer, such as model numbers and serial numbers.

All of the outputs of the multiplexers 280-303 of FIGS. 8A, 8B and 9 are concentrated in a further multiplexing arrangement in FIG. 8B. The entire addressing function for all of the status modules is conducted from the status control logic 41 of FIG. 1 which is a part of the video module. The status control logic 41 is illustrated in detail in FIG. 8B. The twelve bit counter 319 consisting of three cascaded counter chips 325, 320 and 321 is strobed by the inverted pulse form of the system clock on lead 18'. The counter 319 has a preset number hardwired into it, for example the decimal number 4,000, which is sufficiently large to allow the command module to determine that a valid command has been issued and for execution to be initiated prior to status sampling. That is, system clock pulses are counted until either output lead 304 or lead 305 of counter chip 321 goes high. These outputs act through an exclusive OR gate 306 to provide a status go signal 307 to a row counter 308. The next most significant bits of the address information derived from the preset counter 319 are directed on lines 310, 311 and 312 from the counter chips 320 and 321 to the row counter 308 to select 1 to 8 outputs when strobed by the status go signal at lead 307. The first six of the eight status output signals of row counter 308 are connected by leads 313 through 318 to the multiplexers 280 through 303. Since only a single one of the status row leads is high at any one time, only a single set of the multiplexers depicted in FIGS. 8 and 9 will be enabled at any one time.

The next three most significant bits of the counter are used to derive a status address output through status address lines 326, 327, and 328. These status signals are used in both original form and are reversed in polarity by inverters 330-332. The status output lines 326, 327, 328, 333, 334 and 335 drive out the status signal from the particular multiplexer selected in FIGS. 8A, 8B and 9. That is, when status row signal line 318 is high to enable the mutliplexers 280-283, and when status address line 333 is also high, the sequentially selected input in the multiplexor 283 is passed through the status output line 338 therefrom to the shift register 342. The shift register 342 is shifted every four system clock pulses by the two least significant bits of the counter chip 325 acting through AND gate 343. The shift register 342 thereby gates through the sequential status output from the selected one of the multiplexers 280-303 to the serial status line 42 which is connected to the electronic image processor 10 through interface circuitry 15, as depicted in FIG. 1. In this manner, the counter 319 addresses all of the status inputs of all of the multiplexers 280-303 and serially passes them back to the electronic image processor 10 on output line 42 from the shift register 342. In the interface circuitry 15, of FIG. 11 the serial status signal 42 is passed through a combination AND gate/NAND gate 345. This provides signals 346 and 347 of both positive and negative polarity which are transmitted back to the electronic image processor 10 on the nine wire interface 13.

INTERFACE

Actual data governing the actuation of the raster output scanner 14 to either print or refrain from printing as the raster scans in its pattern is transmitted to the adapter 12 on lines 348 through 355 of FIG. 11. The pairs of wires 348-349, 350-351, 352-353 and 354-355 are fed to separate operational amplifiers 358-361 which change the dual polarity current signals employed in association with the electronic image processor 10 to single polarity voltage signals. That is, the signals 362-365 carrying the input data are processed as either existing at a specified voltage level or not existing at all. In addition, the pair of wires 356 and 357 also extends to the adapter 12 in synchronization with the print data and is subjected to the interface conversion to provide a packet sync signal at output 366 of operational amplifier 367. The packet sync pulse is useful in allowing the raster output scanner to keep track of its progress in printing packets of data.

Video data is transferred on the lines 348 through 355 in parallel packets four bits in width and sixteen bits in length as illustrated diagrammatically in FIG. 15. The packet sync signal on line 366 is used both to flag the beginning of a data packet and to identify its type, either regular packet or last packet of a scan line. The packet sync signal always begins with a four bit true flag. These four bits are followed by an eight bit packet identifier, all eight bits of which are true if the packet is the last packet of a scan line and all of which are false if it is a regular packet. The last four bits of the packet sync signal, which is 16 bits in length to correspond with the length of the data bits, are always false.

Figure 10:
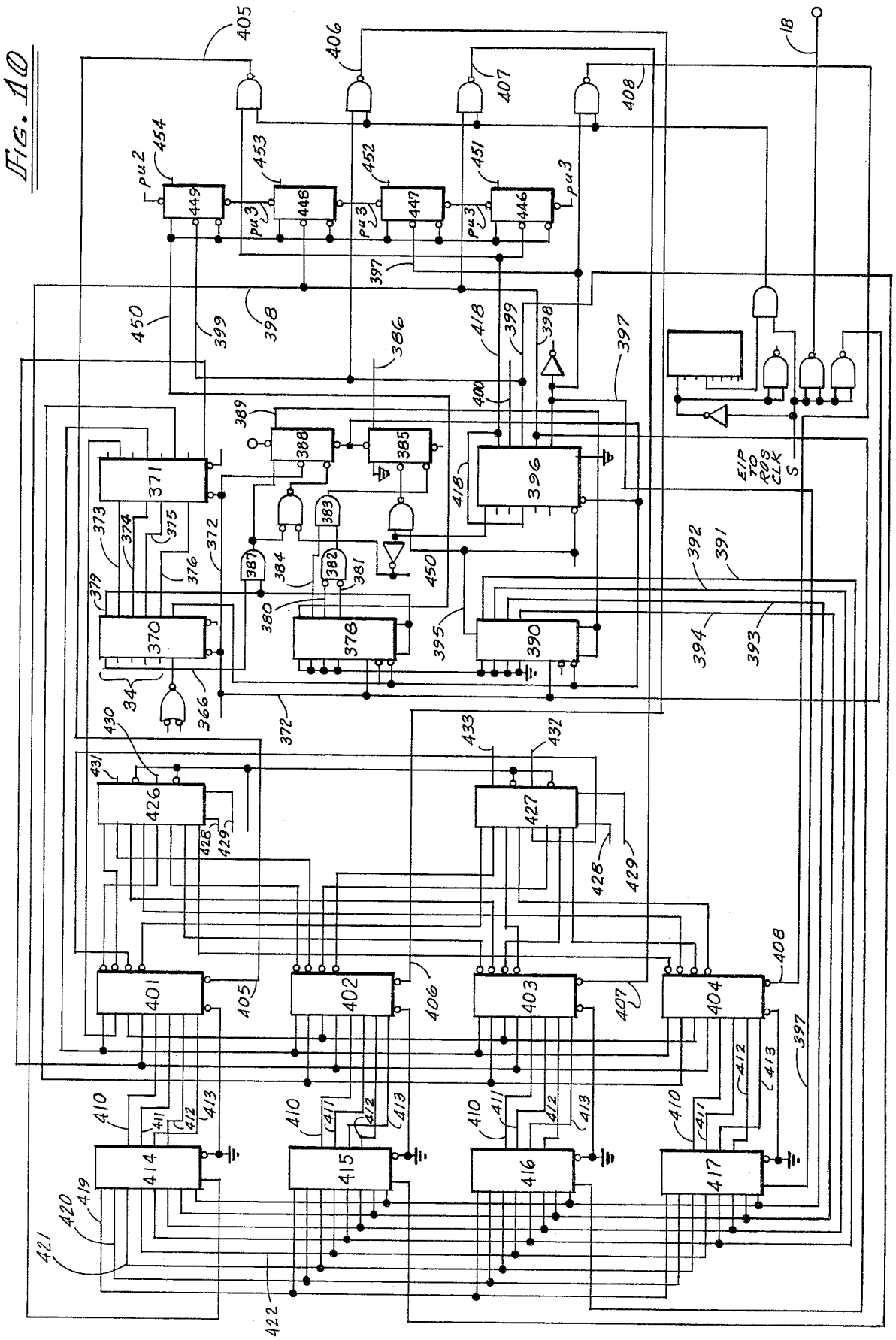
FIG. 10 illustrates in detail the data buffers and the data buffer write control logic of FIG. 1.

The data bits in the packet sync signal are passed to two serially connected buffer registers 370 and 371 depicted in FIG. 10. Data, upon receipt by the buffer register 370, is held and transferred to buffer register 371 with the next system clock pulse that appears at clock input 372, whereupon the data bits are passed on leads 373-376 to the second dual ended buffer register 371. The data pulses are gated out of the buffer 371 upon the occurrence of the next sequential clock pulse which appears at clock lead 372 of the buffer register 371. The packet sync signals from line 366 do not pass to the dual ended buffer 371, but instead are transmitted on line 379 to enable the counter 378 which counts the bits within the packet. The bit counter 378 counts the number of four bit wide parallel arrays of bits that are concurrently transferred on the lines 362-365 to the buffer register 370. The output leads 380 amnd 381 of the counter 378 are connected with inverted inputs to an AND gate 382, the output of which is connected as one input to ANd gate 383. The other input to ANd 383 is the output 384 of counter 378. The two AND gates 382 and 383 are cascaded together and passed as the K input to the J-K flip-flop 385. The AND gates 382 and 383 thereby ensure that the packet sync signal is either four or twelve bits in width. In the absence of any malfunction in this regard, the Q output 386 of the flip-flop 385 is high indicating that the packets are of proper length.

AND gate 387 derives inputs directly from the packet sync signal line 366 and from the packet sync signal as it is transferred from the buffer register 370 to the counter 378 at 379 to provide a J input to the packet flag flip-flop 388. Provided there is consistency, a packet flag signal is generated at the Q output 389 of the flip-flop 388. The packet flag signal steps the write address counter 390 each time it appears. Write address counter 390 is a four bit counter initially loaded with a binary one. Thus, the output lines 391-394 increment by binary bit counts to select one of 16 cells of storage in a random access memory to store the four bit wide data words from the dual ended buffer 371. Overflow of the counter 390 at 395 provides a load signal to the shift register 396 to increment the outputs 397-400 thereof which select one of the four random access memory buffers 401-404. Thus, together the counter 390 and the shift register 396 select one of 16 storage positions in one of four RAM buffers, each storage position being four bits in width.

In response to the selection signals on lines 405-408 of the RAM data buffer modules 401 through 404, the print data is loaded from the dual ended buffer 371 to the address specified on lines 410-413 as determined by the write address counter 390. It should be noted that the write address is first passed through 2 to 1 multiplexer chips 414-417. The multiplexers 414-417 select the write address side of their inputs only when the associated one of the buffers lines 397-399 and 418 of shift register 396 is true. Otherwise, the read addresses at inputs 419-422 are always selected.

VIDEO OUTPUT

Figure 12:
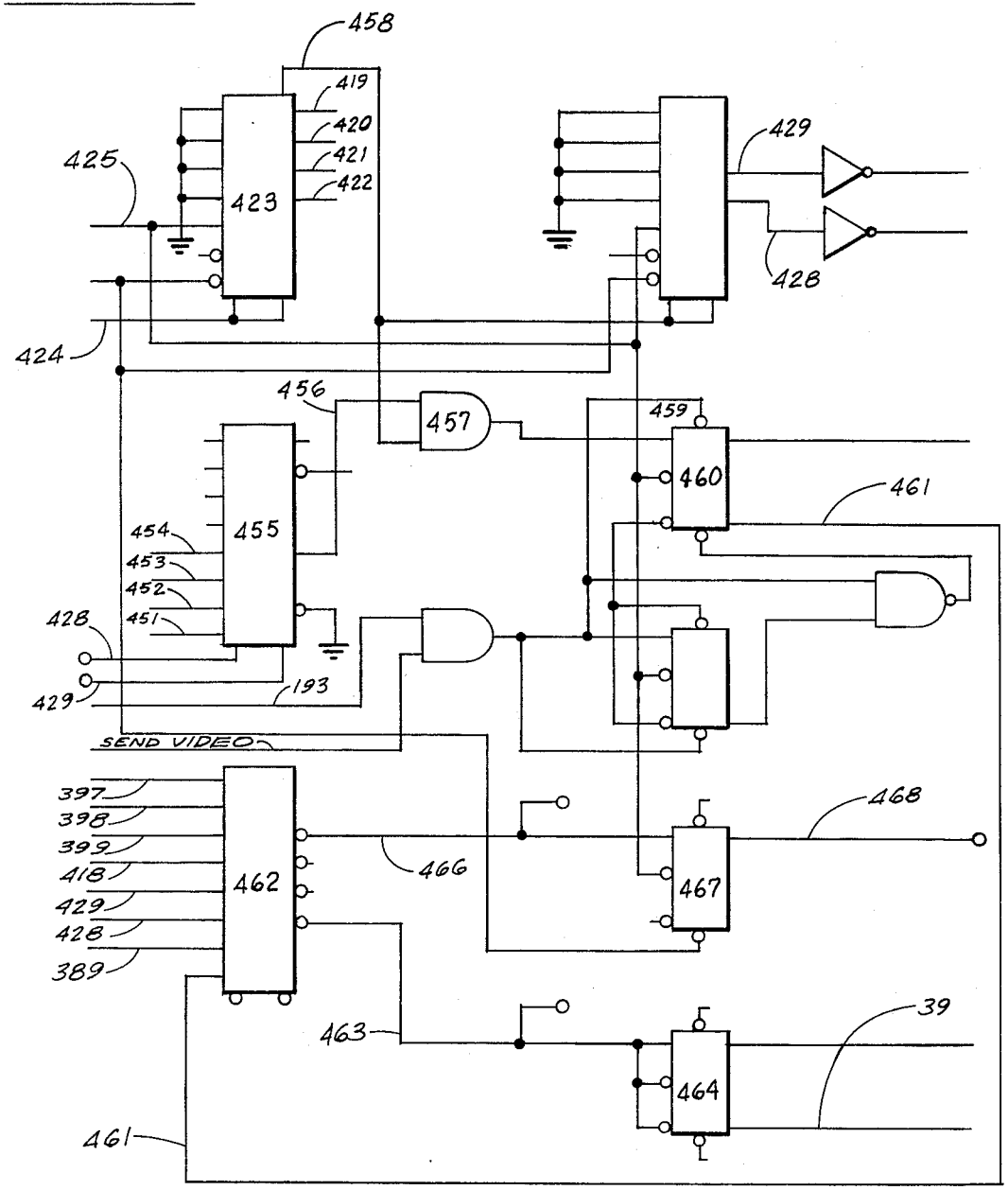
FIG. 12 illustrates in detail the data buffer read control logic of FIG. 1.

The read addresses are generated by the read address counter 423 in FIG. 12 in much the same manner as the write addresses are generated in write address counter 390 in FIG. 10. Unlike write address counter 390, read address counter 423 is enabled by the start video pulse on line 424 and clocked by the scaled bit clock divided by 4 at lead 425. Data is thereby written into the RAM data buffers 401-404 only when the associated one of the lines 397-399 and 418 of shift register 396 in FIG. 10 is true. Otherwise, data is read from the RAM buffers 401-404 from the address selected by the read lines 419-422 to the multiplexers 414-417 in FIG. 10.

Data is read from the RAM data buffers 401-404 through two double 4 to 1 multiplexers 426 and 427. Depending upon which of the read select lines 428 or 429 is selected, data will be read from either top half or bottom half of one of the multiplexers 426 or 427. The data read out will be taken from the RAM data buffer address location as determined by the read address lines 419-422 to the multiplexers 414-417. The output of the multiplexers 426 and 427 is passed as video signals on lines 430-433. The information transmitted will be that information accessed out of the RAM data buffers in response to the read addresses.

The video signals are passed four bits in parallel to the shift register 434 in FIG. 13. The shift register 434 is shifted by the overflow of counter 435 which is a four bit counter that overflows to provide a shift pulse to the shift register 435 on line 436. The video signals on lines 430-433 are sequentially moved to the output lead 438 where they are transferred through an exclusive OR gate 439 to a NAND gate 440. In the absence of a local video enable signal on lead 441, which would indicate that the raster output scanner 14 is operating only in the test mode, the AND gate 440 passes data through the OR gate 442, through the NAND gate 443 and through a subsequent NAND gate 444. A video pulse at 445 at the output of NAND gate 444 modulates the driver for the laser beam in the raster output scanner 14. A pulse at lead 445 results in a print signal to the laser while the absence of a pulse results in the absence of printed data.

PACKET CONTROL

The packet control circuitry depicted in FIG. 10 responds to the overflow 395 of the write address counter 390 which is enabled by the packet flag signal 389 from flip-flop 388, to load the shift register 396. The shift register 396 sequentially selects 1 of 4 output lines 397-400 and overflow line 418 which clock the last packet flip-flops 446-449. When the packet counter 378 reaches its upper limit, indicating that the last packet has arrived, the packet zero signal is fed on line 450 to the J inputs of the four last packet flip-flops 446-449. The flip-flop clocked by the single active one of the lines 297-399 and 418 produces a last packet pulse at the Q output thereof. This last packet output identifies the RAM module in which the last packet of data signals is stored. The last packet signals from Q outputs 451-454 of the last packet flip-flops 446-449 are passed to the dual 4 to 1 multiplexer 455 in FIG. 12 which, in response to the different read select signals at lines 428 and 429 respectively, produces a last packet signal at output 456 to the AND gate 457. When the read address counter 423 overflows, it supplies the other input to the AND gate 457 on line 458. The resulting output 459 is used to trigger a J-K start video flip-flop 460 which terminates the start video signal at the Q output 461. This signal in turn acts through a programmable read only memory 462 to initiate a reset packet request on line 463 to the packet request flip-flop 464. The packet request signal is dispatched at the Q̄ output 39 of packet request flip-flop 464 and is transmitted to the electronic image processor 10 through the interface circuitry of FIG. 11. The packet request signal reaches the electronic image processor 10 through combination AND gate/NAND gate 465.

The programmable ROM 462 depicted in FIG. 12 also generates a set underflow signal at output 466 to indicate that there are empty buffers that are not being filled fast enough. This signal is strobed through the J input of the buffer underflow J-K flip-flop 467 to produce the buffer underflow signal at the Q output 468. The ROM 462 is programmed so that by combining the buffer selection signals at leads 397-399 and 418, the read line select signals on lines 428-429, the packet flag signal on line 389 and the termination of the start video signal on line 461, the ROM 462 will terminate the packet request signal at 39 when the raster output scanner 14 is three packets ahead. This stops further requests for data until another packet has been read out to the video control 37 in in FIG. 1.

I claim:

1. An adapter for interfacing a digital electronic image processor with a raster output scanning printer, said adapter having dedicated input and output connections for printer control and operation, said adapter comprising:

- means for receiving at a first dedicated input connection digital command data from said electronic image processor and for initiating control functions in response thereto;
- means for receiving at a second dedicated input connection digital clock signals of a predetermined uniform frequency transmitted thereto by said electronic image processor and for distributing said clock signals throughout said adapter;
- means for receiving in bit parallel format at a set of third dedicated input connections packets of video print information from said electronic image processor and for retiming said video information for transmission to said printer;
- means for monitoring the transmission of video print information to said printer and for generating data request signals at a first dedicated output connection to said electronic image processor in order to thereby request additional packets of video print information from said electronic image processor;
- means for monitoring the status of said adapter and said printer and for serializing status information and generating said status information at a second dedicated output connection for transmittal to said electronic image processor; and
- said means for receiving command data and for initiating control functions in response thereto comprises sampling means responsive to command bits which occur at a frequency which is an integer quotient of the frequency of said digital clock pulses, said sampling means including means for detecting command bit polarity with the occurrence of consecutive ones of said digital clock pulses during command pulses, means for comparing the command bit polarities detected, and means for generating an error signal when said means for comparing registers an unequal comparison in order to abort the performance of control functions in response to command data including any data bit in which sampling and comparison as aforesaid produces an unequal comparison.

2. The adapter according to claim 1, wherein at least some of said input and output connections are releasable and are arranged in a predetermined spatial array for connection to any one of a plurality of electronic image processors.

3. The adapter according to claim 2, wherein each of said releasable connections comprises a pair of contacts connected in opposing polarity to signal processing means for effectuating a transition between voltage signals and current signals.

4. The adapter of claim 1, wherein four digital clock signals occur with each command bit, and said means for detecting command bit polarity samples command bits with the second and third digital clock signals associated therewith.

5. The adapter of claim 4, wherein said means for detecting command bit polarity additionally includes means for sampling command bits with the first digital clock signals associated therewith, and means for detecting true polarity of a command bit at the occurrence of the first, second and third digital clock signals associated therewith to generate a valid command signal to identify a flag bit preceding a predetermined number of command information bits.

* * * * *